US008608543B2

(12) United States Patent
Cuddy et al.

(10) Patent No.: US 8,608,543 B2

(45) Date of Patent: Dec. 17, 2013

(54) GAMING SYSTEM AND METHOD FOR PROVIDING AN INCREMENTAL WAGERING GAME

(75) Inventors: Ryan W. Cuddy, Reno, NV (US); Kyle Hayden Evans, Washoe Valley, NV (US)

(73) Assignee: IGT, Las Vegas, NV (US)

( * ) Notice: Subject to any disclaimer, the term of this patent is extended or adjusted under 35 U.S.C. 154(b) by 1034 days.

(21) Appl. No.: 12/615,821

(22) Filed: Nov. 10, 2009

(65) Prior Publication Data

US 2011/0111824 A1 May 12, 2011

(51) Int. Cl.
*A63F 13/00* (2006.01)

(52) U.S. Cl.
USPC .............................................. 463/20; 463/16

(58) Field of Classification Search
USPC .................................................... 463/16, 20
See application file for complete search history.

(56) References Cited

U.S. PATENT DOCUMENTS

| | | | |
|---|---|---|---|
| 1,262,134 | A | 4/1918 | Stolle |
| 4,099,722 | A | 7/1978 | Rodesch et al. |
| 4,200,291 | A | 4/1980 | Hooker |
| 4,676,506 | A | 6/1987 | Crouch |
| 4,805,907 | A | 2/1989 | Hagiwara |
| 5,019,973 | A | 5/1991 | Wilcox et al. |
| 5,046,736 | A | 9/1991 | Bridgeman et al. |
| 5,100,137 | A | 3/1992 | Fulton |

(Continued)

FOREIGN PATENT DOCUMENTS

| | | |
|---|---|---|
| AU | 200065501 | 3/2001 |
| EP | 0 840 256 | 5/1998 |

(Continued)

OTHER PUBLICATIONS

Adams Family Advertisement written by IGT, published in 2000, 4 pgs.

(Continued)

*Primary Examiner* — Ronald Laneau
*Assistant Examiner* — Ross Williams
(74) *Attorney, Agent, or Firm* — Neal, Gerber & Eisenberg LLP

(57) ABSTRACT

Various embodiments of the present disclosure provide a gaming device which enables a player to purchase the game in stages or increments. The gaming device enables the player to place a first wager for a play of the game. After receiving the first wager, the gaming device randomly generates and displays a first outcome. The gaming device evaluates the displayed first outcome to determine whether the displayed outcome includes any winning symbol combinations. The gaming device provides the player with any awards associated with any determined winning symbol combinations. After providing the player with any awards based on the displayed first outcome, the gaming device offers the player the opportunity to make a second wager for the play of the game. If the second wager is placed, the gaming device generates and displays the second outcome, while the first outcome remains displayed. The gaming device evaluates the displayed second outcome in combination with the displayed first outcome to determine whether any winning symbol combinations are displayed. The gaming device provides the player with any awards associated with any displayed winning symbol combinations. If the player chooses not to make the second wager for the play of the game, the play of the game terminates. In this manner, the present disclosure enables a player to decide when to continue building on an outcome that is good and when to stop the play of the game.

21 Claims, 23 Drawing Sheets

(56) References Cited

U.S. PATENT DOCUMENTS

| | | | | |
|---|---|---|---|---|
| 5,123,649 | A | 6/1992 | Tiberio | |
| 5,152,529 | A | 10/1992 | Okada | |
| 5,167,413 | A | 12/1992 | Fulton | |
| RE34,244 | E | 5/1993 | Hagiwara | |
| 5,248,142 | A | 9/1993 | Breeding | |
| 5,251,897 | A | 10/1993 | Fulton | |
| 5,411,257 | A | 5/1995 | Fulton | |
| 5,494,287 | A | 2/1996 | Manz | |
| 5,511,781 | A | 4/1996 | Wood et al. | |
| 5,573,249 | A | 11/1996 | Johnson | |
| 5,633,993 | A | 5/1997 | Redmann et al. | |
| 5,695,188 | A | 12/1997 | Ishibashi | |
| 5,766,074 | A | 6/1998 | Cannon et al. | |
| 5,788,574 | A | 8/1998 | Ornstein et al. | |
| 5,806,855 | A | 9/1998 | Cherry | |
| 5,807,172 | A | 9/1998 | Piechowiak | |
| 5,807,177 | A | 9/1998 | Takemoto et al. | |
| 5,820,460 | A | 10/1998 | Fulton | |
| 5,839,730 | A | 11/1998 | Pike | |
| 5,855,515 | A | 1/1999 | Pease et al. | |
| 5,876,284 | A | 3/1999 | Acres et al. | |
| 5,882,259 | A | 3/1999 | Holmes, Jr. et al. | |
| 5,890,962 | A | 4/1999 | Takemoto | |
| 5,911,418 | A | 6/1999 | Adams | |
| 5,967,518 | A | 10/1999 | Rowe | |
| 5,971,849 | A | 10/1999 | Falciglia | |
| 6,004,207 | A | 12/1999 | Wilson, Jr. et al. | |
| 6,027,115 | A | 2/2000 | Griswold et al. | |
| 6,033,307 | A | 3/2000 | Vancura | |
| 6,048,269 | A | 4/2000 | Burns et al. | |
| 6,059,289 | A | 5/2000 | Vancura | |
| 6,062,981 | A | 5/2000 | Luciano, Jr. | |
| 6,068,552 | A | 5/2000 | Walker et al. | |
| 6,077,163 | A | 6/2000 | Walker et al. | |
| 6,089,976 | A | 7/2000 | Schneider et al. | |
| 6,155,925 | A | 12/2000 | Giobbi et al. | |
| 6,159,097 | A | 12/2000 | Gura | |
| 6,186,894 | B1 | 2/2001 | Mayeroff | |
| 6,203,429 | B1 | 3/2001 | Demar et al. | |
| 6,213,875 | B1 | 4/2001 | Suzuki | |
| 6,224,482 | B1 | 5/2001 | Bennett | |
| 6,224,483 | B1 | 5/2001 | Mayeroff | |
| 6,231,442 | B1 | 5/2001 | Mayeroff | |
| 6,251,013 | B1 | 6/2001 | Bennett | |
| 6,270,411 | B1 | 8/2001 | Gura et al. | |
| 6,270,412 | B1 | 8/2001 | Crawford et al. | |
| 6,279,902 | B1 | 8/2001 | Yamazaki et al. | |
| 6,290,603 | B1 | 9/2001 | Lucian, Jr. et al. | |
| 6,309,301 | B1 | 10/2001 | Sno | |
| 6,358,147 | B1 | 3/2002 | Jaffe et al. | |
| 6,375,187 | B1 | 4/2002 | Baerlocher | |
| 6,375,570 | B1 | 4/2002 | Poole | |
| 6,379,245 | B2 | 4/2002 | DeKeller | |
| 6,398,218 | B1 | 6/2002 | Vancura | |
| 6,411,276 | B1 | 6/2002 | Braun et al. | |
| 6,419,578 | B1 | 7/2002 | Moody et al. | |
| 6,425,823 | B1 | 7/2002 | Byrne | |
| 6,468,156 | B1 | 10/2002 | Hughs-baird et al. | |
| 6,494,785 | B1 | 12/2002 | Gerrard et al. | |
| 6,506,118 | B1 | 1/2003 | Baerlocher et al. | |
| 6,514,141 | B1 | 2/2003 | Kaminkow et al. | |
| 6,537,150 | B1 | 3/2003 | Luciano et al. | |
| 6,544,120 | B2 | 4/2003 | Ainsworth | |
| 6,569,013 | B1 | 5/2003 | Taylor et al. | |
| 6,569,015 | B1 | 5/2003 | Baerlocher et al. | |
| 6,599,192 | B1 | 7/2003 | Baerlocher et al. | |
| 6,612,927 | B1 | 9/2003 | Slomiany et al. | |
| 6,632,141 | B2 | 10/2003 | Webb et al. | |
| 6,648,754 | B2 | 11/2003 | Baerlocher et al. | |
| 6,648,759 | B2 | 11/2003 | Vancura | |
| 6,692,355 | B2 | 2/2004 | Baerlocher et al. | |
| 6,702,289 | B1 | 3/2004 | Feola | |
| 6,702,671 | B2 | 3/2004 | Tarantino | |
| 6,702,675 | B2 | 3/2004 | Poole et al. | |
| 6,712,693 | B1 | 3/2004 | Hettinger | |
| 6,719,632 | B2 | 4/2004 | Palmer et al. | |
| 6,722,981 | B2 | 4/2004 | Kaminkow et al. | |
| 6,722,982 | B2 | 4/2004 | Kaminkow et al. | |
| 6,746,016 | B2 | 6/2004 | Perrie et al. | |
| 6,758,750 | B2 | 7/2004 | Baerlocher et al. | |
| 6,786,820 | B2 | 9/2004 | Gerrard et al. | |
| 6,793,579 | B2 | 9/2004 | Baerlocher et al. | |
| 6,796,905 | B2 | 9/2004 | Baerlocher et al. | |
| 6,802,778 | B1 | 10/2004 | Lemay et al. | |
| 6,808,452 | B2 | 10/2004 | Baerlocher et al. | |
| 6,808,454 | B2 | 10/2004 | Gerrard et al. | |
| 6,811,483 | B1 | 11/2004 | Webb et al. | |
| 6,832,957 | B2 | 12/2004 | Falconer | |
| 6,852,030 | B2 | 2/2005 | Baerlocher et al. | |
| 6,890,257 | B2 | 5/2005 | Baerlocher | |
| 6,896,617 | B2 | 5/2005 | Daley | |
| 6,899,623 | B2 | 5/2005 | Baerlocher | |
| 6,942,566 | B2 | 9/2005 | Baerlocher et al. | |
| 6,942,567 | B2 | 9/2005 | Baerlocher et al. | |
| 6,960,132 | B2 | 11/2005 | Baerlocher et al. | |
| 6,966,833 | B2 | 11/2005 | Kaminkow et al. | |
| 6,971,953 | B2 | 12/2005 | Gerrard et al. | |
| 6,994,624 | B2 | 2/2006 | Gold et al. | |
| 7,001,273 | B2 | 2/2006 | Baerlocher | |
| 7,029,395 | B1 | 4/2006 | Baerlocher | |
| 7,040,984 | B2 | 5/2006 | Mead | |
| 7,108,602 | B2 | 9/2006 | Daly | |
| 7,160,186 | B2 | 1/2007 | Cuddy et al. | |
| 7,192,349 | B2 | 3/2007 | Baerlocher et al. | |
| 7,198,569 | B2 | 4/2007 | Wolf et al. | |
| 7,235,010 | B2 | 6/2007 | Baerlocher | |
| 7,250,001 | B2 | 7/2007 | Baerlocher et al. | |
| 7,264,545 | B2 | 9/2007 | Maya et al. | |
| 7,270,604 | B2 | 9/2007 | Gerrard et al. | |
| 7,275,989 | B2 | 10/2007 | Moody | |
| 7,326,114 | B2 | 2/2008 | Webb et al. | |
| 7,329,179 | B2 | 2/2008 | Baerlocher | |
| 7,331,864 | B2 | 2/2008 | Baerlocher | |
| 7,364,507 | B2 | 4/2008 | Baerlocher et al. | |
| 7,393,278 | B2 | 7/2008 | Gerson et al. | |
| 7,407,435 | B2 | 8/2008 | Baerlocher et al. | |
| 7,419,429 | B2 | 9/2008 | Taylor et al. | |
| 7,470,184 | B2 | 12/2008 | Baerlocher et al. | |
| 7,507,155 | B2 | 3/2009 | Mead et al. | |
| 7,654,895 | B2 | 2/2010 | Pacey | |
| 7,927,204 | B2 * | 4/2011 | DeBrabander et al. | 463/16 |
| 2001/0054794 | A1 | 12/2001 | Cole et al. | |
| 2002/0193158 | A1 | 12/2002 | Weiss et al. | |
| 2003/0017865 | A1 | 1/2003 | Beaulieu et al. | |
| 2003/0040360 | A1 | 2/2003 | Kaminkow | |
| 2003/0073480 | A1 | 4/2003 | Thomas et al. | |
| 2003/0078093 | A1 | 4/2003 | Simms et al. | |
| 2003/0162584 | A1 | 8/2003 | Hughs-baird et al. | |
| 2003/0207713 | A1 | 11/2003 | Taylor | |
| 2004/0023713 | A1 | 2/2004 | Wolf et al. | |
| 2004/0023715 | A1 | 2/2004 | Luciano, Jr. et al. | |
| 2004/0038724 | A1 | 2/2004 | Asdale | |
| 2004/0106444 | A1 | 6/2004 | Cuddy et al. | |
| 2004/0180710 | A1 | 9/2004 | Palmer et al. | |
| 2004/0242313 | A1 * | 12/2004 | Munoz | 463/20 |
| 2005/0009597 | A1 | 1/2005 | Daly | |
| 2005/0020342 | A1 | 1/2005 | Palmer et al. | |
| 2005/0032567 | A1 | 2/2005 | Baerlocher et al. | |
| 2005/0037829 | A1 | 2/2005 | Baerlocher et al. | |
| 2005/0054413 | A1 | 3/2005 | Randall et al. | |
| 2005/0054429 | A1 | 3/2005 | Baerlocher et al. | |
| 2005/0060050 | A1 | 3/2005 | Baerlocher | |
| 2005/0071023 | A1 | 3/2005 | Gilliland et al. | |
| 2005/0096121 | A1 * | 5/2005 | Gilliland et al. | 463/20 |
| 2005/0096123 | A1 * | 5/2005 | Cregan et al. | 463/20 |
| 2005/0101375 | A1 | 5/2005 | Webb et al. | |
| 2005/0124406 | A1 | 6/2005 | Cannon | |
| 2005/0130729 | A1 | 6/2005 | Baerlocher et al. | |
| 2005/0143170 | A1 | 6/2005 | Maya et al. | |
| 2005/0164777 | A1 * | 7/2005 | Daly | 463/20 |
| 2005/0197180 | A1 | 9/2005 | Kaminkow et al. | |
| 2005/0208992 | A1 | 9/2005 | Randall | |
| 2005/0282625 | A1 | 12/2005 | Nicely | |
| 2006/0003837 | A1 | 1/2006 | Baerlocher et al. | |

(56) References Cited

U.S. PATENT DOCUMENTS

| | | | | |
|---|---|---|---|---|
| 2006/0040728 | A1 * | 2/2006 | Fuller | 463/20 |
| 2006/0046816 | A1 | 3/2006 | Walker et al. | |
| 2006/0063580 | A1 | 3/2006 | Nguyen et al. | |
| 2006/0116196 | A1 | 6/2006 | Vancura | |
| 2006/0121966 | A1 | 6/2006 | Baerlocher | |
| 2006/0128457 | A1 | 6/2006 | Cannon | |
| 2006/0172791 | A1 | 8/2006 | Wolf | |
| 2006/0267283 | A1 | 11/2006 | Jackson | |
| 2007/0021182 | A1 | 1/2007 | Gauselmann | |
| 2007/0087804 | A1 | 4/2007 | Knowles et al. | |
| 2007/0135207 | A1 | 6/2007 | Tarantino | |
| 2007/0155466 | A1 | 7/2007 | Baerlocher et al. | |
| 2007/0243921 | A1 * | 10/2007 | Fanjoy et al. | 463/13 |
| 2007/0275778 | A1 * | 11/2007 | Fong et al. | 463/20 |
| 2007/0287532 | A1 | 12/2007 | Jackson | |
| 2007/0298872 | A1 | 12/2007 | Gerrard et al. | |
| 2008/0026806 | A1 | 1/2008 | Gold et al. | |
| 2008/0039184 | A1 | 2/2008 | Inamura | |
| 2008/0058090 | A1 | 3/2008 | Okada | |
| 2008/0076503 | A1 | 3/2008 | Mattice et al. | |
| 2008/0102923 | A1 * | 5/2008 | Esses et al. | 463/20 |
| 2008/0214292 | A1 | 9/2008 | Bryant et al. | |
| 2009/0042652 | A1 | 2/2009 | Baerlocher et al. | |
| 2009/0088239 | A1 | 4/2009 | Iddings et al. | |
| 2009/0104979 | A1 | 4/2009 | Ruymann | |
| 2009/0121434 | A1 | 5/2009 | Baerlocher et al. | |
| 2009/0124316 | A1 | 5/2009 | Baerlocher et al. | |
| 2010/0016055 | A1 * | 1/2010 | Englman | 463/20 |
| 2011/0045894 | A1 * | 2/2011 | Owen | 463/25 |

FOREIGN PATENT DOCUMENTS

| | | |
|---|---|---|
| EP | 0 945 837 | 9/1999 |
| EP | 1 054 368 | 11/2000 |
| EP | 1 082 979 | 3/2001 |
| GB | 2 316 214 | 2/1998 |
| JP | 2004-000323 | 1/2004 |
| JP | 2009-189859 | 8/2009 |
| WO | WO 99/10849 | 3/1999 |
| WO | WO 01/74464 | 10/2001 |
| WO | WO 2005/010831 | 2/2005 |
| WO | WO 2006/002241 | 1/2006 |
| WO | WO 2006/004831 | 1/2006 |
| WO | WO 2007/090270 | 8/2007 |

OTHER PUBLICATIONS

By George Video Slots Advertisement written by IGT, published in 2002, 2 pgs.

Double Up Poker Game Description written by IGT, published prior to 2001.

Legato, “Creepy and Kooky; IGT’s The Addams Family’ mines ’60s-sitcom culture to create a wildly entertaining slot,” published in Strictly Slots, vol. 2, No. 8 in Jul. 2000, 3 pgs.

Multi-Strike Poker Article written by Strictly Slots, published Sep. 2004.

Multi-Strike Poker Advertisement written by International Game Technology, available in 2004.

Letter from Marvin A. Motsenbocker of Mots Law dated Jul. 8, 2011 regarding Third Party Submission in Published Application Under 37 C.F.R. 1.99 filed for U.S. Appl. No. 12/615,821 (1 page).

Third Party Submission in Published Application Under 37 C.F.R. 1.99 filed for U.S. Appl. No. 12/615,821, dated Jul. 8, 2011 (3 pages).

English translation of paragraphs [0124], [0125], and [0126] of JP 2004-000323 submitted with Third Party Submission in Published Application Under 37 C.F.R. 1.99 filed for U.S. Appl. No. 12/615,821 (1 page).

English translation of paragraph [0013] of JP 2009-189859 submitted with Third Party Submission in Published Application Under 37 C.F.R. 1.99 filed for U.S. Appl. No. 12/615,821 (1 page).

* cited by examiner

FIG. 5A

Paytable 300a

| | |
|---|---|
| AAA | 10 |
| BBB | 15 |
| CCC | 20 |
| DDD | 25 |
| EEE | 30 |

Average Expected Payback = 88%

FIG. 5B

Paytable 300b

| | |
|---|---|
| AAA | 10 |
| BBB | 15 |
| CCC | 20 |
| DDD | 25 |
| EEE | 30 |
| AAAA | 50 |
| BBBB | 75 |
| CCCC | 100 |
| DDDD | 150 |
| EEEE | 200 |

Average Expected Payback = 92%

FIG. 5C

Paytable 300c

| | |
|---|---|
| AAA | 10 |
| BBB | 15 |
| CCC | 20 |
| DDD | 25 |
| EEE | 30 |
| AAAA | 50 |
| BBBB | 75 |
| CCCC | 100 |
| DDDD | 150 |
| EEEE | 200 |
| AAAAA | 250 |
| BBBBB | 500 |
| CCCCC | 750 |
| DDDDD | 1000 |
| EEEEE | 2000 |

Average Expected Payback = 96%

GAMING SYSTEM AND METHOD FOR PROVIDING AN INCREMENTAL WAGERING GAME

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Certain known gaming devices use mechanical devices such as reels, wheels or spheres to enhance the attraction of the gaming machines to players and also to enhance the player's game playing experience. These mechanical devices enable a player to see physical movements of components of a game, a portion of a game, or a functional game event or element which increases the player's enjoyment of the game.

Many known slot gaming devices include a plurality of reels and one or more paylines. Such gaming devices typically include a suitable number of reels, such as three to five reels, which each have a suitable number of symbols, such as twenty five symbols per reel. In these gaming devices, the player initiates the spinning of the reels by making one or more wagers on one or more paylines. Such gaming devices may have one, three, five, nine, fifteen, twenty-five or any other suitable number of paylines which extend horizontally, vertically, diagonally or any combination thereof. The player wagers on a player selected number or combination of paylines, such as one, two, three, five, ten or fifteen paylines and the reels are activated to spin.

The reels spin and display a plurality of the symbols, and the gaming device analyzes the displayed symbols to determine if the gaming device has randomly generated a winning symbol or winning symbol combination on or along one or more of the wagered on paylines. Any awards associated with any winning symbols or winning symbol combinations displayed along any wagered on paylines are provided to the player. A paytable determines each award that a player wins for designated winning symbols or designated winning symbol combinations occurring on each activated payline. A line pay award typically is calculated by multiplying the award value for the winning symbol or winning symbol combination by the amount wagered upon the payline upon which the winning symbol combination appears. Such calculated awards are provided to the player.

In conventional slot games, for example, if a player wagers one credit on a first payline and one credit on a second payline, the player has activated two paylines. Making an additional wager activates another payline or increases the wager played on an activated payline. This creates a play of the game having a certain number of activated paylines by a certain number of credits per payline.

Most slot machines are set to pay back on average a certain percentage of the amount of money wagered by players. The average percentage of money wagered that is paid back to the player as an award is sometimes called the average expected payback or average expected payback percentage. The average payback provided by a game is in part determined by the paytable. In a slot game, the paytable determines each award that will be provided for each winning symbol or winning symbol combination appearing on an activated or wagered on payline.

To increase player excitement and enjoyment, it is desirable to provide new games which provide players with new and different game features which vary award returns and risk.

SUMMARY

In one embodiment, the gaming system or gaming device of the present disclosure provides a game having a plurality of reels and a plurality of symbols on each reel. The gaming device enables the player to initiate a round or play of the game by making a first wager on a first subset of the plurality of reels. The first subset includes a plurality but less than all of the plurality of reels. After the player places the first wager on the first subset, the gaming device activates the reels of the first subset to generate and display an outcome for the first subset. The gaming device evaluates the displayed outcome for the first subset to determine whether the displayed outcome includes any winning symbol combinations. The gaming device provides the player with any awards associated with any determined winning symbol combinations. After providing the player with any awards based on the displayed outcome of the first subset, the gaming device offers the player the opportunity to make a second wager to activate a second, different subset of the reels which includes less than all of the reels. It should be appreciated that none of the reels of the first subset are included in the second subset. If the player chooses to make the second wager, the gaming device activates the reels of the second subset while the reels of the first subset are held stationary. The gaming device displays an outcome for the second subset. The gaming device evaluates the displayed outcome of the second subset in combination with the displayed outcome of the first subset to determine whether any winning symbol combinations are displayed. That is, the gaming device evaluates the symbols displayed on the reels of the first subset in combination with the symbols displayed on the reels of the second subset to determine whether those symbols form any winning symbol combinations. The gaming device provides the player with any awards associated with any winning symbol combinations displayed as a result of the activations of the first and second subsets.

If there are any reels remaining that have not been wagered-on (and, as a result, activated) in the play of the game, the gaming device offers the player an opportunity to place a third wager on a third, different subset of the reels, and the above process continues until the player has wagered on the maximum available number of reels or the player chooses not to place the wager on the next subset. It should be appreciated that, as the player progresses through the game, the gaming device provides the player with an award for each winning symbol combination associated with each separate wager placed in the game.

The present disclosure thus provides, in one embodiment, a slot game which may be purchased in sequential stages or subsets. For a first wager, the player purchases the opportunity to spin a first subset of reels. Based on the result of the first subset, the player can separately purchase the chance to spin an additional subset of reels to try to add to or build on the result of the first subset. In this manner, the present disclosure enables a player to decide when to build on an outcome that is good and when to stop the play of the game.

In one embodiment, after the player obtains an outcome for each subset of the reels, the gaming device determines the wager amount required to activate the next subset of the reels based at least in part on the previous outcome. For example, after the gaming device generates an outcome for the first subset of the reels, the amount of the second wager required to obtain an outcome for the second, different subset of the reels is determined based at least in part on the outcome for the first subset. Different results for the first subset cause different wager amounts to be required for activating the second subset. In one embodiment, the gaming system dynamically calculates the wager required to continue the game based on the likelihood of certain events occurring based on the outcome of the first subset. For example, if a symbol combination including five BAR symbols is the top winning symbol combination in a five-reel game, and the player receives three BAR symbols as a result of the activation of the first subset of the reels (e.g., the first three reels of the five-reel game), the cost to continue in the game will be set at an amount which is higher than if the player had received no BAR symbols as a result of the activation of the first subset of the reels (and thus had no chance at winning the top prize if that player were to continue the game). In other embodiments, the gaming system determines the wager required to continue the game based on the chance that a designated number of symbols will be displayed on the reels in a scatter pay arrangement, the chance that a bonus symbol will be displayed on the reels, or the chance that any other suitable event will occur based on any previously displayed outcomes for the play of the game. In various embodiments, a number of different factors may be considered in determining the wager amount required to continue the game, including the existing symbols displayed on the reels, the probability of other symbols occurring, the paytable employed, and maintaining a desired return to the player.

In this manner, the present disclosure provides a gaming device which enables a player to play a game in stages or subsets. The player can choose whether to advance to a next stage or subset based on the outcome received at each stage or subset. The cost to continue in the game is determined based at least in part upon the outcome of the previous stage or subset (i.e., the previous outcome received). Thus, the cost of continuing in the game is dynamic based upon the previous outcome received. In various embodiments, the gaming device can offer the player larger wagers (and larger payouts) when the player chooses to continue the play of the game. This gives the game designer greater flexibility in controlling the payout and provides motivation for the player to continue in the game, regardless of prior outcome received.

In one alternative embodiment, a gaming device provides an offer and acceptance-type game, which may be played in stages. In this embodiment, the gaming device enables a player to place a first wager to initiate a play of the game. After receiving the first wager, the gaming device randomly generates and displays a first outcome to the player. The gaming device evaluates the generated first outcome to determine whether the first outcome includes a terminating or game-ending event or condition. If the displayed first outcome includes the terminating event, the play of the game ends. If the first outcome does not include the terminating event, the gaming device offers the player a first award based on the displayed first outcome. The gaming device enables the player to accept or reject the offered award. If the player accepts the offered award, the gaming device provides the award to the player and the play of the game ends.

If the player rejects the offered award, the gaming device enables the player to place an additional wager to obtain an additional outcome in an attempt to improve the award that is offered to the player. The additional outcome is evaluated in combination with any previously displayed outcomes to determine any award that will be offered to the player. After the player places the additional wager, the gaming device randomly generates and displays the additional outcome, while the first outcome remains displayed. If, after the additional outcome is generated and displayed, the determination is that the terminating event occurs, the game ends. In this case, the player loses any previously offered awards, as well as any wagers placed in the play of the game. If the determination is that the terminating event does not occur, the gaming device makes the player a new award offer based on the additional outcome and any previously generated outcomes. Once again, the player can choose to accept or reject the offered award. The above process continues until an outcome is generated that causes the terminating event to occur or until the player accepts the award being offered to the player.

In one such embodiment, the game includes a symbol display, grid or matrix having a plurality of different symbol positions that define at least one column and at least one row, and preferably a plurality of columns and a plurality of rows. The gaming device enables the player to place a first wager to initiate the game. Before the player places the first wager for the game, the matrix is blank or empty, such that no symbols are displayed in any of the symbol positions of the matrix. After the player places the first wager, the gaming device generates and displays a plurality of symbols in a first row of the matrix. In one embodiment, the symbols are "dropped" into the rows of the matrix, such that the first row to be filled with symbols is the bottom row of the matrix. The gaming device evaluates the symbols displayed in the first row of the matrix to determine a first award to offer to the player. The gaming device enables the player to accept or reject the first award. If the player accepts the first award, the gaming device provides the first award to the player and the game ends. The symbols displayed in the matrix disappear. If the player rejects the first award, the player has the opportunity to place an additional wager to cause the gaming device to generate another row of symbols. If the player utilizes the opportunity to place the additional wager, a new row of symbols drops down into the matrix, stacking on top of the previously filled first row of symbols. Based on the new symbols that have dropped into the display matrix, the gaming device makes the player a new award offer. The player can choose to accept or reject this new award. If the player accepts the new award, the gaming device provides the new award to the player and the game ends. Any symbols displayed in the matrix disappear. If the player rejects the new award, the player again has the opportunity to increase the wager (i.e., place an additional wager) and continue dropping symbols into the next row of the matrix in an attempt to improve upon the award offer. This process continues until the player accepts the award being offered, until the matrix is full, or until the terminating event occurs.

It should be appreciated that, when the terminating event occurs, the game ends and the player loses all previous wagers, as well as any award offers that were previously made to the player. In this manner, as the player progresses through the stages of the game, the player is betting on how long the player can advance through the game without losing the offered award upon an occurrence of a terminating or game ending condition.

Accordingly, the above embodiments enable a player to play for larger awards by enabling the player to purchase a game in stages. After each stage, the player determines whether to advance to a next stage in the game based on the outcome received for that stage. This gives the player a greater level of control in the game and increases the player's excitement and enjoyment of the game.

Additional features and advantages are described in, and will be apparent from, the following Detailed Description and the figures.

BRIEF DESCRIPTION OF THE FIGURES

FIGS. 5A, 5B, and 5C illustrate three example paytables employed in the example play of the slot game illustrated in FIGS. 4A to 4H.

DETAILED DESCRIPTION

The present disclosure may be implemented in various configurations for gaming machines, gaming devices or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
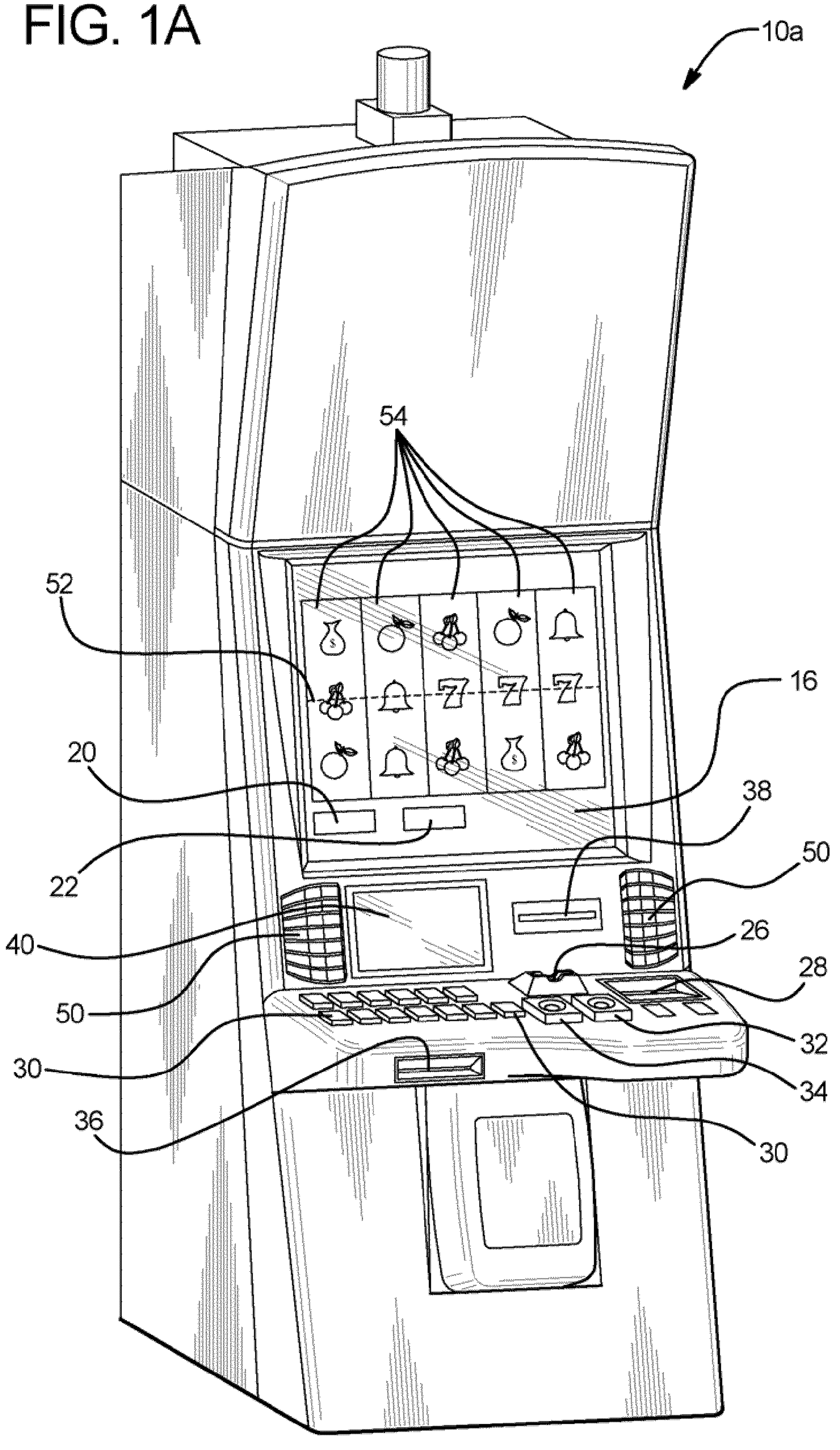
FIGS. 1A and 1B are perspective views of alternative embodiments of the gaming device of the present disclosure.
Figure 1B:
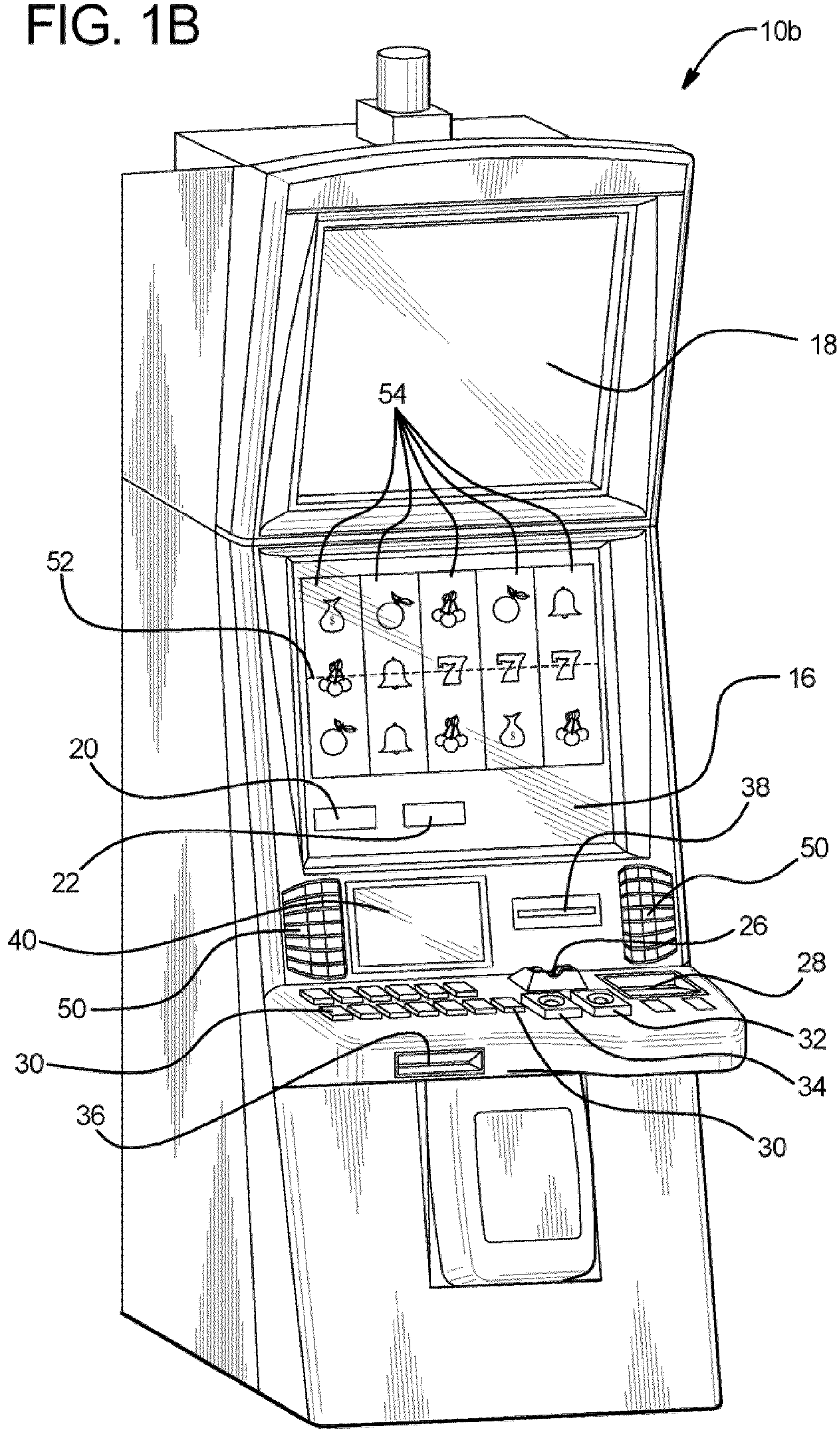

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
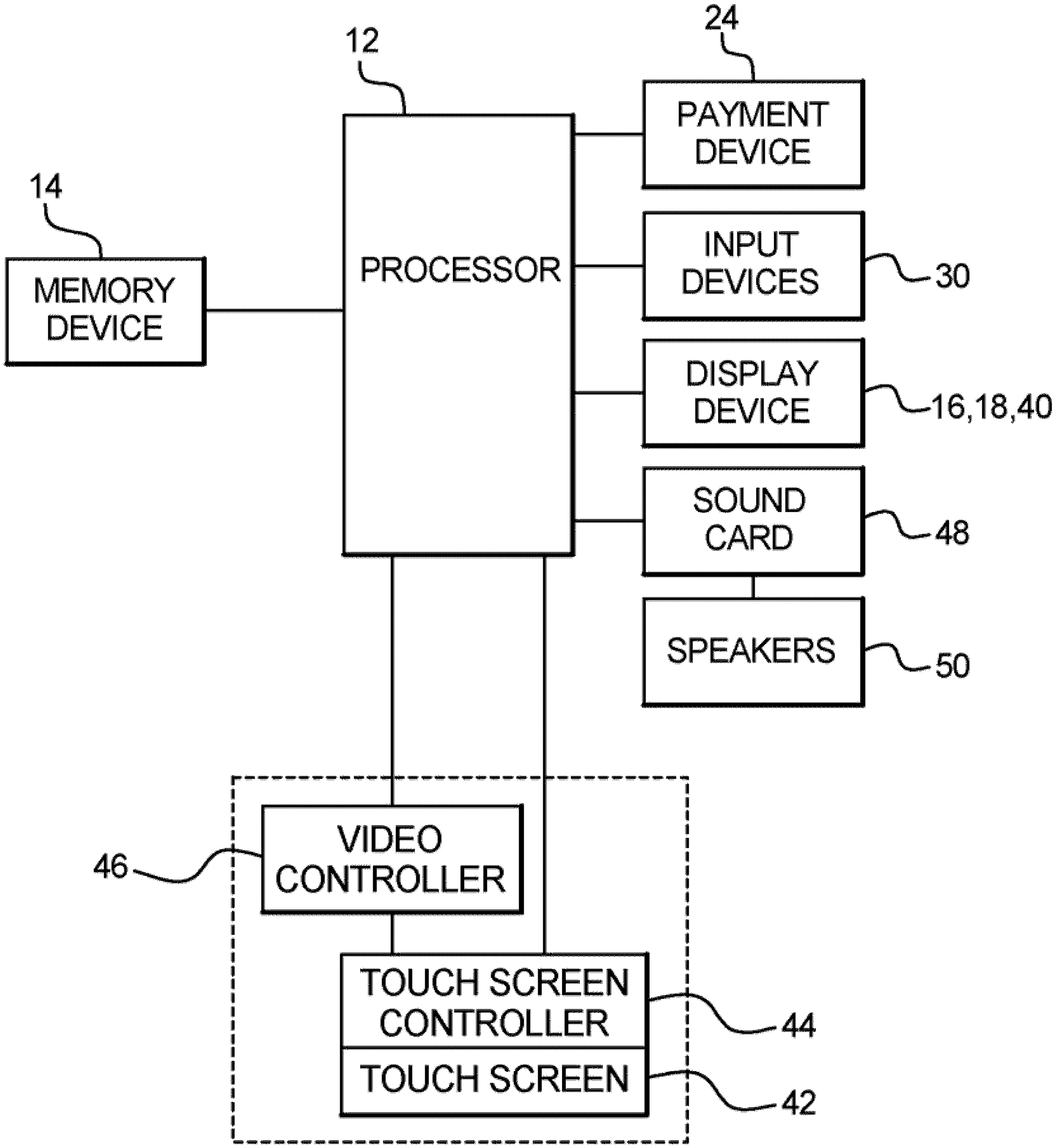
FIG. 2A is a schematic block diagram of the electronic configuration of one embodiment of the gaming device of the present disclosure.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, paytable data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device or system may include some or all of the features of conventional gaming machines or devices. The primary game, base game whether played as wagering games or free games may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented and played as wagering games and free games.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols.

This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game, playable as a wagering game and/or free game, may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game, playable as a wagering game and/or free game, may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, playable as a wagering game and/or free game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game, playable as a wagering game and/or free game, or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
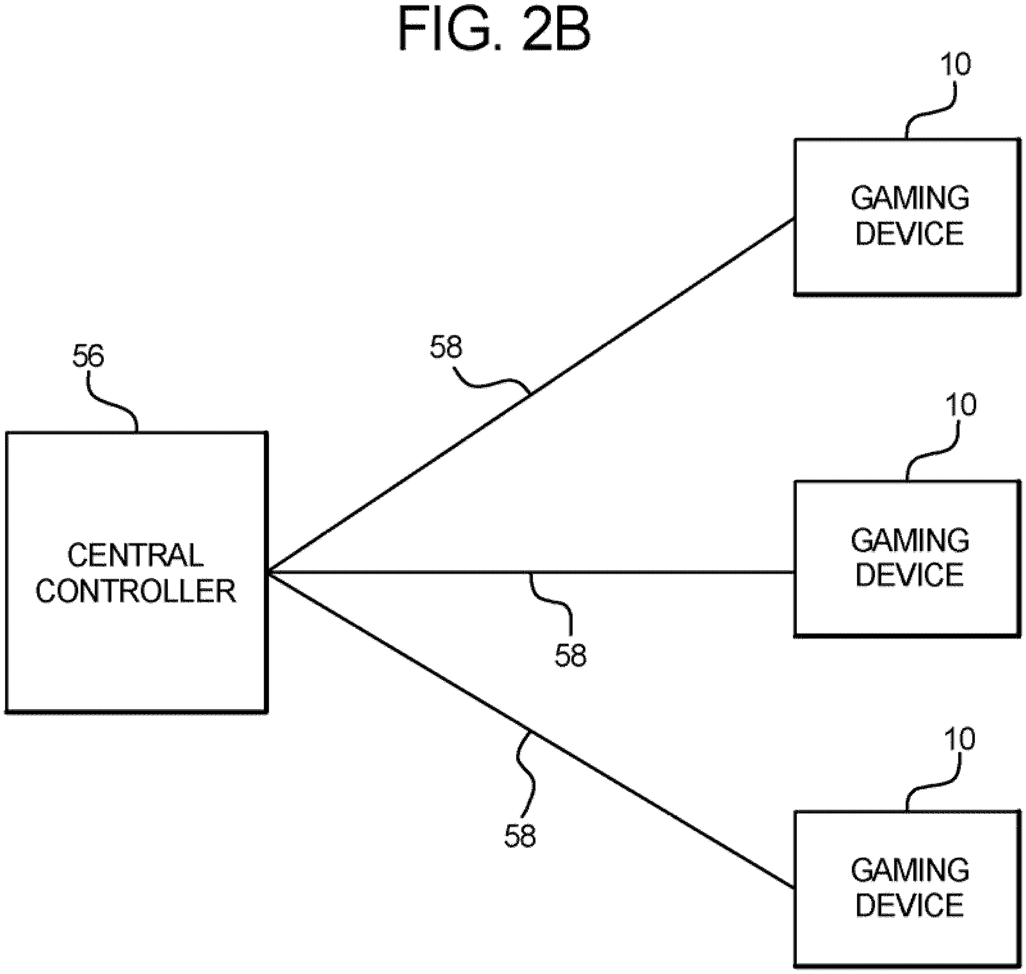
FIG. 2B is a schematic block diagram illustrating a plurality of gaming devices in communication with a central controller.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Incremental Wagering Game

Figure 3:
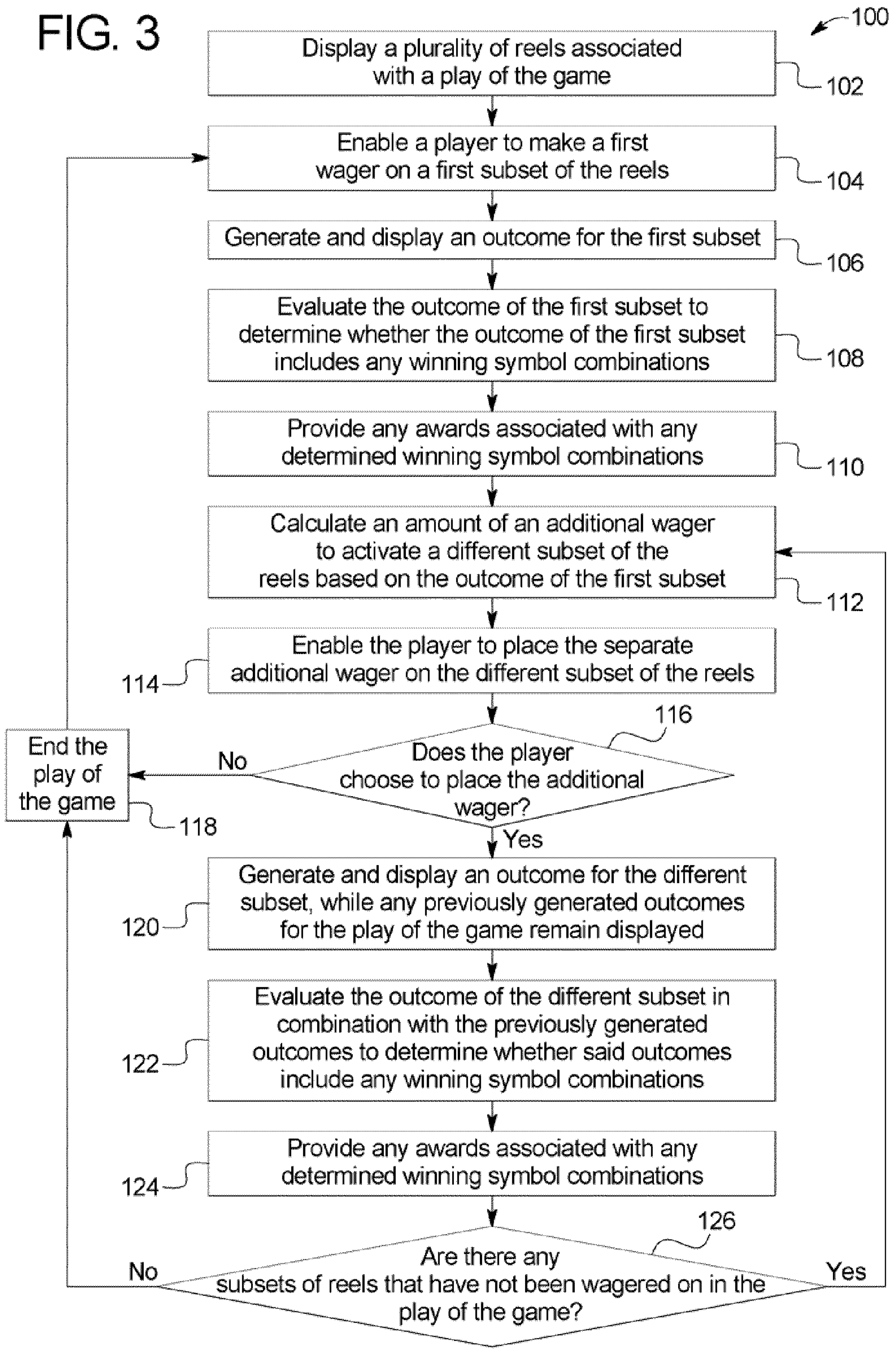
FIG. 3 is a flowchart of one example process for one embodiment disclosed herein.

Referring now to FIG. 3, one embodiment of the present disclosure operates according to sequence 100. In one embodiment, a gaming device includes at least one primary or base game operable upon a wager by a player. In one such embodiment, the primary or base game is associated with a plurality of reels, each of the reels including a plurality of symbols. The gaming device displays the plurality of reels associated with the game, as indicated by block 102. The gaming device enables a player to initiate a round or play of the game by making a first or initial wager on a first subset of the plurality of reels, as indicated by block 104. In one embodiment, the first subset includes a plurality but less than all of the plurality of reels.

After the player places the first wager on the first subset, the gaming device generates and displays an outcome for the first subset, as indicated by block 106. The gaming device evaluates the displayed outcome of the first subset to determine whether the displayed outcome of the first subset includes any winning symbol combinations, as indicated by block 108. If the outcome of the first subset includes any winning symbol combinations, the gaming device provides the player with any awards associated with the determined winning symbol combinations, as indicated by block 110.

After providing the player with any awards based on the displayed outcome of the first subset, the gaming device determines or calculates an amount of a separate, additional wager required to activate a different subset of the reels, as indicated by block 112. More particularly, the gaming device dynamically calculates the amount of the additional wager for the different subset of reels based, at least in part, on the outcome for the first subset of the reels. In various embodiments, a number of factors may be considered in determining the wager amount required to continue the game, including the existing symbols displayed on the reels, the probability of other symbols occurring, the paytable employed, and maintaining a desired return to the player.

Referring again to FIG. 3, the gaming device enables the player to places the separate, additional wager to activate the different subset of the reels, as indicated by block 114. The player can choose to make the additional wager to activate (and, as a result, obtain an outcome for) the different subset of reels. The outcome of the different subset will be evaluated in combination with the outcome of the first subset. Alternatively, the player can choose to end the game by not placing the additional wager on the different subset. Thus, if the displayed outcome for the first subset is a good or winning outcome (e.g., includes a winning symbol combination or another combination of symbols that is likely to result in a winning symbol combination if the player were to continue the game), the player can place the additional wager to try to build on that outcome. If the displayed outcome for the first subset is not a good outcome, the player can end the game immediately, without having to play out the rest of the game (i.e., activate any remaining subset(s) of the reels).

The gaming device determines whether the player chooses to place the additional wager, as indicated by diamond 116. If the player chooses not to place the additional wager, the play of the game ends, as indicated by block 118. The player can start a new game by wagering on the first subset of the reels, as indicated by block 104.

If the determination is made that the player has chosen to make the additional wager, the gaming device generates and displays an outcome for the different subset, while any previously generated outcomes for the play of the game remain displayed, as indicated by block 120. In one embodiment, the different subset includes at least one reel from the plurality of reels. In one embodiment, the different subset includes a plurality of reels from the plurality of reels. It should be appreciated, however, that none of the reels of the first subset are included in the different subset. When the gaming device activates or spins the reel(s) of the different subset to generate the outcome for the different subset, the reels of the first subset are held stationary, such that the outcome that was generated and displayed for the first subset remains displayed.

As indicated by block 122, after the gaming device generates and displays the outcome for the different subset, the gaming device evaluates the outcome for the different subset in combination with any previously generated outcomes to determine whether the displayed outcomes include any winning combinations of symbols. That is, the gaming device evaluates the symbols displayed on the reels of the first subset in combination with the symbols displayed on the reels of the different subset to determine whether those symbols form any winning symbol combinations. If the determination is made that the displayed outcomes include any winning symbols combinations, the gaming device provides the player with any awards associated with the determined winning symbols combinations, as indicated by block 124.

The gaming device determines whether there are any subsets of the reels remaining which have not been wagered on in the play of the game, as indicated by diamond 126. If there is at least one subset of the reels that has not been wagered on in the play of the game, the gaming device calculates an amount of a separate, additional wager required to activate a different subset of the reels, which has not been wagered on in the play of the game, and the above process repeats itself beginning at block 112. If the determination is made that the player has wagered on the maximum available number of reels (i.e., there are no reels (and, thus, no subsets of the reels) remaining which have not been wagered on), the play of the game ends. The player may begin a new play of the game by placing the first wager for the first subset of the reels.

Accordingly, the present disclosure provides a gaming device which enables a player to play a game in stages or subsets. After each stage (i.e., after receiving an outcome for each wagered-on subset of the reels), the player can choose to continue the play of the game based on the outcome received at that stage, or the player can choose to end that play of the game and start a new game. It should be appreciated that the gaming device provides the player with an award for each winning symbol combination generated associated with each separate wager placed.

Referring now to FIGS. 4A, 4B, 4C, 4D, 4E, and 4F, an example of one embodiment of the present disclosure is illustrated wherein a gaming device enables a player to play a game in stages or subsets. In the example of FIGS. 4A to 4F, the display device 16 displays a primary game, and more particularly a slot game, which includes a plurality of reels 54*a*, 54*b*, 54*c*, 54*d*, and 54*e*, each of the reels including a plurality of symbols. It should be appreciated that the reels may be cascading reels, independent reels, dependent reels, or any other suitable type of reels. It should also be appreciated that the primary game is not limited to a slot game and may be any game operable on a wager, such as poker, blackjack, keno, and any other suitable wagering game. In the illustrated example, the plurality of reels 54*a*, 54*b*, 54*c*, 54*d*, and 54*e* are broken down into three subsets. The first subset includes the first three reels 54*a*, 54*b*, and 54*c*; the second subset includes the fourth reel 54*d*; and the third subset includes the fifth reel 54*e*.

The gaming device includes a wager meter 82, a credit meter 84, and three different "Spin Reels" buttons, including a first button 86 to spin the first subset of the reels (i.e., the first, second, and third reels); a second button 88 to spin the second subset of the reels (i.e., the fourth reel); and a third button 90 to spin the third subset of the reels (i.e., the fifth reel). The gaming device also includes an "End Play" button that the player can activate or press to end the play of the game. The gaming device further includes a message display 80. In this example, the message display 80 communicates information regarding game status and outcomes to the players. It should be appreciated, however, that the message display 80 may be used for any suitable purpose.

Figure 4A:
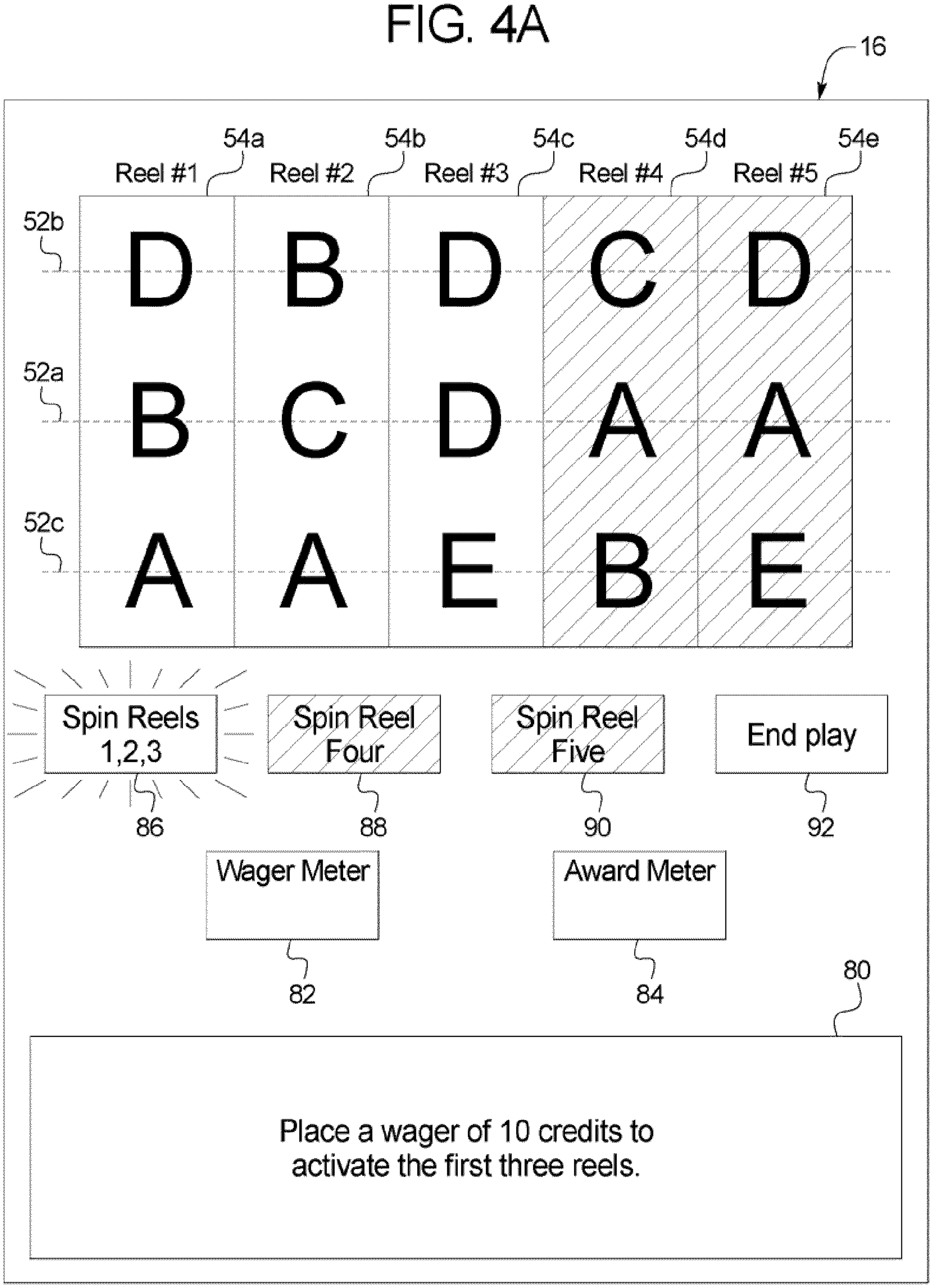
FIGS. 4A, 4B, 4C, 4D, 4E, 4F, and 4G are front views of a display device of a gaming device of one embodiment disclosed herein, which enables a player to play a slot game in stages.

As illustrated in FIG. 4A, the gaming device displays a message in message display 80 prompting the player to make a first wager of ten credits to activate the first subset of the reels (i.e., first three reels 54*a*, 54*b*, and 54*c*) for the play of the game. The first button 86 to spin the first, second, and third reels is highlighted or illuminated to indicate to the player that the player can utilize this button to activate the first three reels. However, the second button 88 and the third button 90 are shaded to indicate that these buttons cannot be used at this time. The fourth reel 54*d* and the fifth reel 54*e* are also shaded to indicate these reels cannot be activated at this time. It should be appreciated that, in various embodiments, the reels and/or the buttons for spinning the reels may be shaded, marked, covered, invisible or designated in any suitable manner to indicate to the player that they are not currently available for use in the game.

Figure 4B:
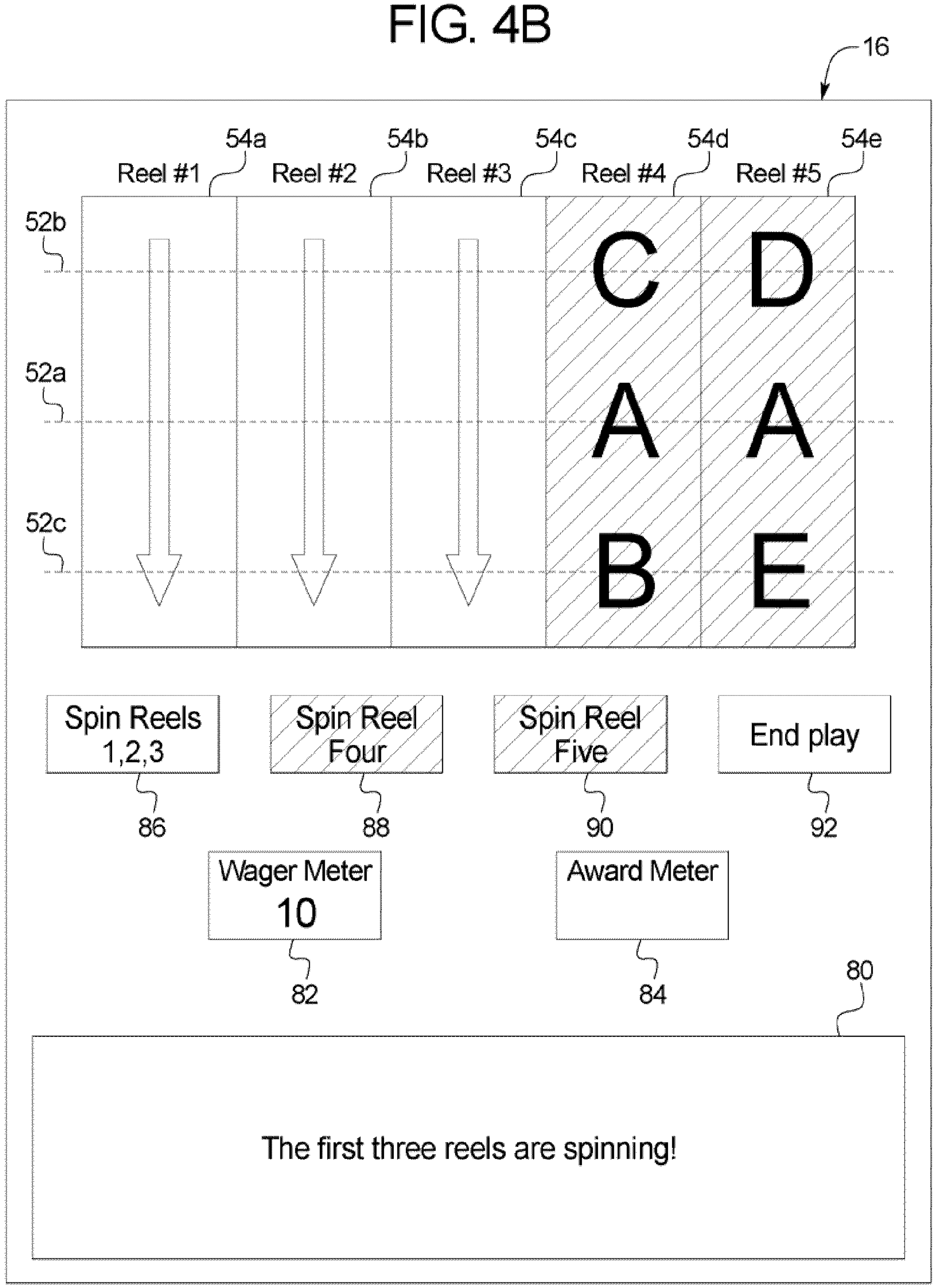

As seen in FIG. 4B, the player has placed a wager of ten credits on the first three reels, as indicated by the message display 80. Also, the wager meter 82 shows the number "10" to reflect the wager amount placed by the player. The first three reels 54*a*, 54*b*, and 54*c* are spinning. The fourth reel 54*d* and the fifth reel 54*e* is still shaded, indicating that these reels are not yet available to be activated in the play of the game.

Figure 4C:
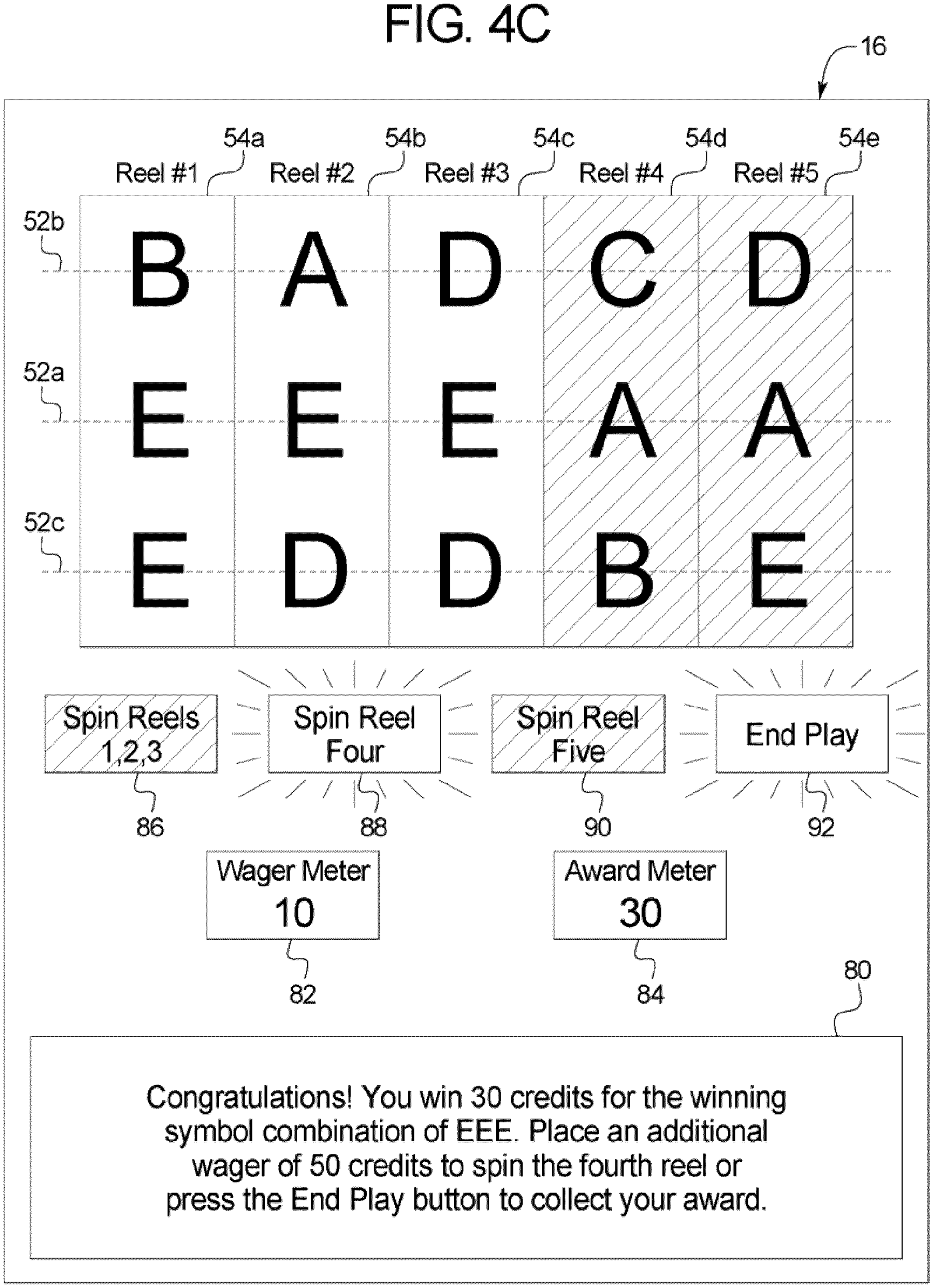

As illustrated in FIG. 4C, after the reels stop spinning, a plurality of symbols is displayed on first three reels 54*a*, 54*b*, and 54*c*. The gaming device evaluates the symbols displayed on the first three reels 54*a*, 54*b*, and 54*c* to determine whether any winning symbol combinations are indicated along any of the paylines 52*a*, 52*b*, and 52*c*.

Referring now to FIGS. 5A, 5B, and 5C, in one embodiment, the gaming device includes a plurality of different paytables. Each of the different subsets of reels in the game is associated with a different one of the paytables. Each time one of the subsets of reels is activated to randomly generate and display an outcome for that subset, the gaming device employs the paytable associated with that subset to determine any awards to provide to the player. In one embodiment, each of the plurality of paytables corresponds to a number of reels. In one such embodiment, the gaming device uses a different one of the plurality of paytables for each different number of reels being evaluated for each stage or subset of the game. For example, a first subset including three reels is activated for a play of the game. The gaming device employs a first one of the paytables to evaluate the symbols displayed on the three reels to determine any awards to provide to the player. After a second subset including one reel is subsequently activated in that play of the game (and thus a total of four reels have been activated for the play of the game), the gaming device employs a second, different one of the paytables for evaluating the symbols displayed on the four reels to determine any awards.

It should be appreciated that the play of the game changes in one or more ways based on the paytable employed at each stage of the game. For example, as the player goes from one stage to the next stage (and more reels are activated and evaluated for determining awards), the paytable employed at the next stage of the game may have: (i) a different average expected payback; (ii) a different volatility but the same average expected payback; (iii) a different number of symbols; (iv) different types of symbols; (v) different proportion and/or ordering of symbols; (viii) different types of winning symbol combinations; (ix) a different number of winning symbol combinations; or (x) any suitable combination of these. In one embodiment, advancing from one stage of the game to the next stage could enable a player to play the game employing a paytable with a higher average expected payback. In one embodiment, the volatility of the paytable changes when the player advances from one stage to the next stage in the game. The volatility pertains to the range of the values of the awards. In one embodiment, one paytable may include higher and lower award values than another paytable having substantially the same average expected payback. For example, for a first stage of the game, the gaming device uses a first paytable that provides awards of a smaller or moderate size, on average, but does so on a relatively frequent basis. If the player advances to the second stage of the game, the gaming device uses a second paytable associated with higher awards, on average, that are provided less frequently. The award disparity creates enhanced levels of excitement for a player because the player can obtain a large award by playing with a more volatile paytable. In another embodiment, both the average expected payback and the volatility of the paytable change when the player advances from one stage to the next stage in the game.

As illustrated in FIGS. 5A, 5B, and 5C, each of Paytable 300*a*, Paytable 300*b*, and Paytable 300*c* includes symbols or symbol combinations that produce respective awards for the player. The symbol combinations, their respective awards, and the chance of said symbol combinations occurring (not shown) of each of Paytable 300*a*, Paytable 300*b*, and Paytable 300*c* determine the average expected payback for that paytable. It should be appreciated that for illustration purposes, FIGS. 5A, 5B, and 5C display a sampling of the different symbol combinations in Paytable 300*a*, Paytable 300*b*, and Paytable 300*c*. It should be appreciated that Paytable 300*a*, Paytable 300*b*, and Paytable 300*c* do not show losing or non-winning outcomes or other potential winning outcomes.

In the illustrated paytables of FIGS. 5A, 5B, and 5C, the paytables each have a different number of winning symbols or symbol combinations and a different average expected payback. For example, the first paytable 300*a* has five winning symbol combinations and an average expected payback of 88%. Each of the winning symbol combinations of the first paytable 300*a* includes three symbols. The second paytable 300*b* has ten winning symbol combinations and an average expected payback of 92%. The second paytable 300*b* includes all five of the three-symbol winning symbol combinations of the first paytable 300*a* and five additional winning symbol combinations, which each include four symbols. Thus, the second paytable 300*b* includes winning symbol combinations, which do not exist in the first paytable 300*a*, and the second paytable 300*b* also has more winning symbol combinations than the first paytable 300*b*. The second paytable 300*b* thus has a higher average expected payback (i.e., 92%), which takes into account the additional higher-paying winning symbol combinations included in the second paytable. The third paytable 300*c* has fifteen winning symbol combinations, including all five of the winning symbol combinations of the first paytable, the five winning symbol combinations of the second paytable, and five additional winning symbol combinations that have five symbols. The third paytable 300*c* therefore includes winning symbol combinations which do not exist on the first or second paytables. The third paytable 300*c* has a higher average expected payback (i.e., 96%) than each of the first and second paytables because of the additional higher-paying winning symbol combinations included in the third paytable. Thus, in this example, each of the plurality of different paytables has a different average expected payback. In other embodiments, a plurality of paytables each have a different average expected payback.

In the example play of the game of FIGS. 4A to 4G, the first subset of the reels is associated with the first paytable 300*a*; the second subset of the reels is associated with the second paytable 300*b*; and the third subset of the reels is associated with the third paytable 300*c*. That is, after the activation of the first subset (i.e., after the first three reels have been activated to generate and display a plurality of symbols) in the play of the game, the gaming device employs the first paytable 300*a* to determine any awards. If the fourth reel is subsequently activated in that play of the game, the gaming device employs the second paytable 300*b* to determine any awards. If the fifth reel is subsequently activated in the play of the game, the gaming device employs the third paytable 300*c* for determining awards. At each stage of the game, the gaming device only evaluates the number of reels that have been wagered-on (and, as a result, activated) in the game. Thus, the gaming device can more quickly perform evaluations and, consequently, the player can more quickly assess and make decisions about whether or not to continue the play of the game.

In another embodiment, rather than using a different paytable for determining awards after each subset is activated, the game utilizes different parts of the same paytable, such as the third paytable 300*c* of FIG. 5C. In this example, after the activation of the first subset (i.e., after the first three reels have been activated to generate and display a plurality of symbols) in the play of the game, the gaming device utilizes only the part of the third paytable 300*c* which includes winning symbol combinations that use three reels (e.g., A-A-A, B-B-B, C-C-C, etc). The 4-symbol and 5-symbol winning symbol combinations of the third paytable 300*c* are not considered at this stage of the game because only three reels have been activated in the game so far. Since the gaming device only has to consider a part of the paytable, evaluations are performed quicker.

Referring back to FIG. 4C, the gaming device evaluates the symbols displayed on the first three reels 54*a*, 54*b*, and 54*c* to determine whether any winning symbol combinations are indicated on any of the paylines 52*a*, 52*b*, and 52*c*. Paytable 300*a* of FIG. 5A, which is associated with the first subset of the reels, is employed at this stage of the game. A winning symbol combination including three "E" symbols is indicated on the middle payline 52*a*. According to paytable 300*a*, the winning symbol combination including three "E" symbols is associated with an award of thirty credits. The award meter 84 is updated to reflect that the player has won an award of thirty credits for the first wager placed in the play of the game. The gaming device displays a message in message display 80 congratulating the player for winning the award of thirty credits. The message in the message display 80 also indicates that, at this point in the game, the player can choose to either: (i) place an additional wager of fifty credits to spin the fourth reel; or (ii) press the "End Play" button 92 to collect the award the player has won so far (i.e., thirty credits) and end the play of the game. Accordingly, the "Spin Reel Four" button 88 and the "End Play" button 92 are illuminated or highlighted, indicating that these are the options available to the player at this point in the game.

If the player chooses to place the additional wager on the second subset of the reels (i.e., the fourth reel 54*d*), the fourth reel 54*d* will spin and the gaming device will employ the paytable 300*b* of FIG. 5B to determine any awards based on the symbols displayed on the first, second, third, and fourth reels. Paytable 300*b* has a higher average expected payback than the paytable which was employed for determining awards based on the outcome of the first subset of the reels (i.e., paytable 300*a*). Thus, in this example, by placing the additional wager to continue playing the game, the player is purchasing the chance to play the game with a better paytable.

In one embodiment, after the player obtains an outcome for each subset of the reels, the gaming device determines the additional wager amount required to activate a next subset of the reels based on the previous outcome. In the illustrated embodiment, the gaming device calculates the amount of the wager required to spin the second subset of the reels (i.e., the fourth reel 54*d*) based on the outcome of the first subset of the reels (i.e., the first three reels 54*a*, 54*b*, and 54*c*). Since the player obtained a winning symbol combination including three "E" symbols as a result of the activation of the first subset of the reels, the player's chances of obtaining the top prize in the game (i.e., an award of two thousand credits for a winning symbol combination of five "E" symbols, as indicated in Paytable 300*c* of FIG. 5C) is increased. Additionally, since paytable 300*a* and paytable 300*b* include a plurality of overlapping or common winning symbol combinations (i.e., paytable 300*b* includes each of the winning symbol combinations of paytable 300*a*), the player is guaranteed to win at least thirty credits if the player chooses to place the additional wager to spin the fourth reel 54*d*. That is, since three "E" symbols are already displayed on the first subset of the reels, the player knows that the reels will display a winning symbol combination including at least three "E" symbols after the fourth reel is activated. Therefore, the wager required for the player to continue this play of the game will be higher than if the player had not obtained the "E-E-E" winning symbol combination as a result of the activation of the first subset.

It should be appreciated that, in various alternative embodiments, the different paytables for the different stages of the game may not have overlapping winning symbol combinations, or may have varying degrees of overlapping winning symbol combinations. For example, referring to the example above, paytable 300*b* of FIG. 5B could be modified such that it only includes winning symbol combinations having four symbols (i.e., A-A-A-A, B-B-B-B, C-C-C-C, D-D-D-D, and E-E-E-E) and does not include any winning symbol combinations having three symbols (i.e., A-A-A, B-B-B, C-C-C, D-D-D, and E-E-E). If this were the case, even though the player obtained an award for the "E-E-E" winning symbol combination in the activation of the first subset, the player would not be guaranteed to win an award by advancing to the second stage of the game. This is taken into account when determining or calculating the wager amount required to advance to the next stage in the game. That is, in a game employing the modified version of paytable 300*b*, the wager required to advance to the second stage of the game (i.e., spin the fourth reel) would be less than if the paytable 300*b* shown in FIG. 5B were being employed.

Figure 4D:
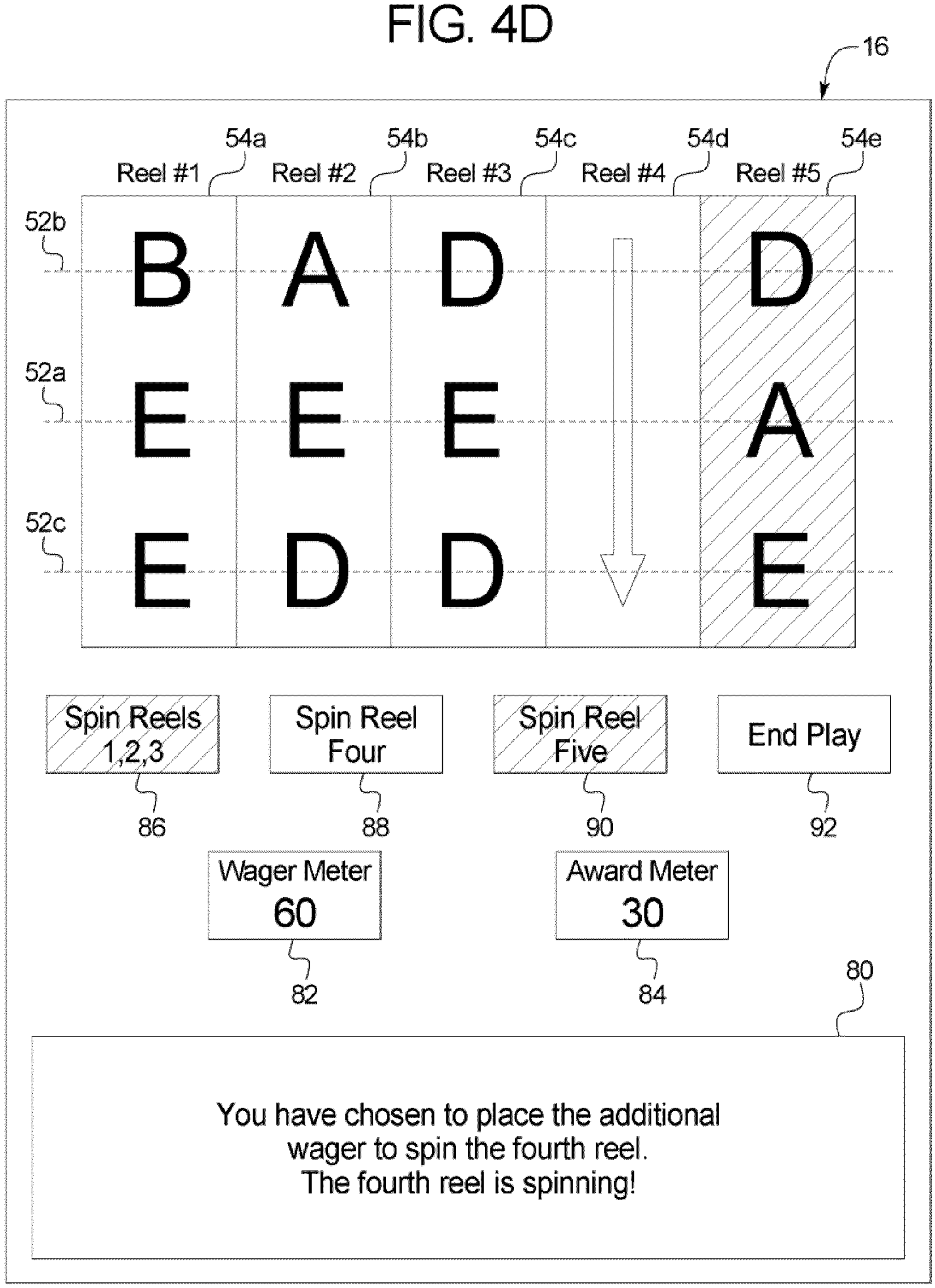

As seen in FIG. 4D, the player has chosen to place the additional wager of fifty credits to spin the fourth reel 54*d*. Accordingly, the wager meter 82 is updated to show that the player has now wagered a total of sixty credits in the play of the game (i.e., ten credits for the first subset, plus fifty credits for the second subset). The fourth reel 54*d* is spinning while the first three reels 54*a*, 54*b*, and 54*c* are held stationary. That is, the symbols that were generated and displayed on the first three reels 54*a*, 54*b*, and 54*c* remain displayed, as the fourth reel 54*d* is spinning. The fifth reel 54*e* is still shaded, indicating that this reel is not yet available to be activated in the play of the game.

Figure 4E:
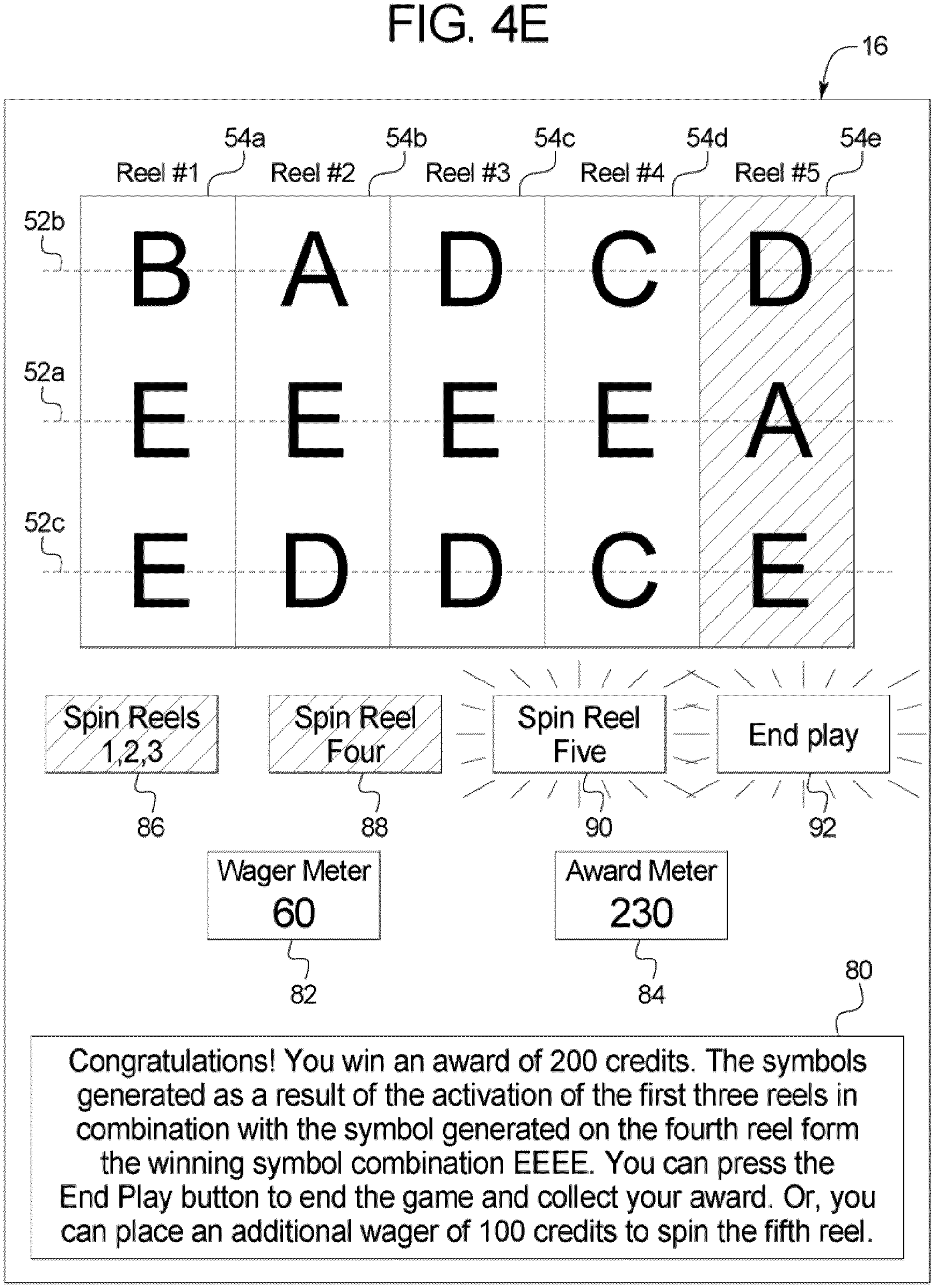

As seen in FIG. 4E, an outcome is generated and displayed for the second subset of the reels (i.e., the fourth reel 54*d*). The gaming device evaluates the symbols displayed on the fourth reel 54*d* in combination with the symbols displayed on the first subset of the reels (i.e., the first three reels 54*a*, 54*b*, and 54*c*). The activation of the fourth reel 54*d* resulted in another "E" symbol indicated on the middle payline 52*a*. Thus, there is a symbol combination including four "E" symbols indicated on the middle payline 52*a*. The gaming device employs paytable 300*b* of FIG. 5B to determine any awards. The winning symbol combination including four "E" symbols is associated with an award of two hundred credits, according to paytable 300*b*.

Accordingly, in FIG. 4E, the award meter 84 is updated to reflect that the player has won an additional award of two hundred credits in associated with the second wager placed in the play of the game. More specifically, the award meter 84 now shows the number "230." The gaming device displays a message in message display 80 congratulating the player for winning the additional award of two hundred credits. The message in the message display 80 also indicates that, at this point in the game, the player can choose to either: (i) place an additional wager of one hundred credits to spin the fifth reel 54*e*; or (ii) press the "End Play" button 92 to collect the award the player has won so far (i.e., 230 credits) and end the play of the game. The "Spin Reel Five" button 90 and the "End Play" button 92 are illuminated or highlighted, indicating that these are the options available to the player at this point in the game.

It should be appreciated that, since the player obtained another "E" symbol as a result of the activation of the second subset of the reels (and now has a winning symbol combination of four "E" symbols displayed on the middle payline 52*a*), the probability that the player will obtain the winning symbol combination of five "E" symbols has dramatically increased. Therefore, the wager required for the player to continue this play of the game is higher than if the player had not obtained the fourth "E" symbol on the fourth reel 54*d*.

Figure 4F:
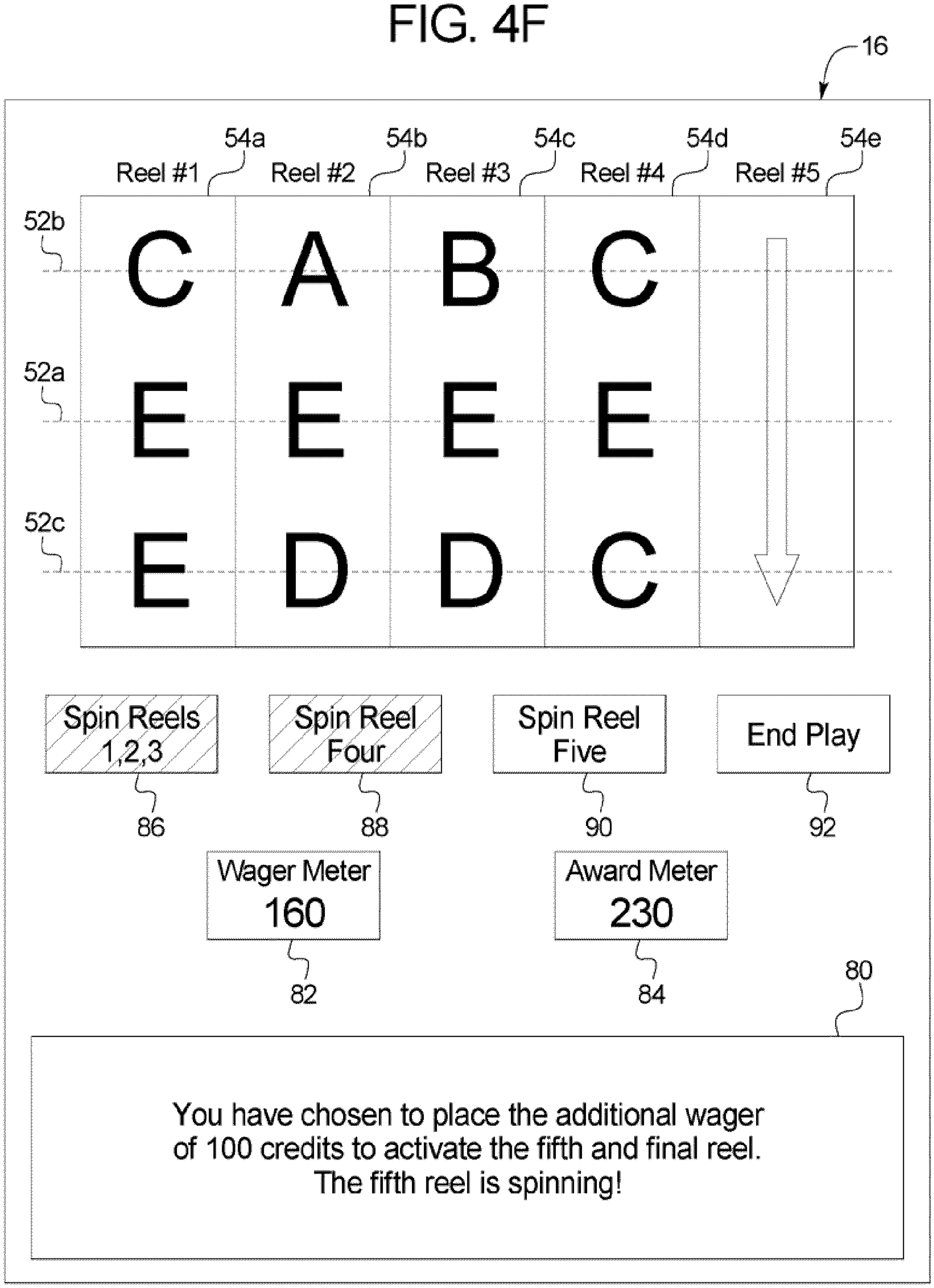

As illustrated in FIG. 4F, the player has chosen to place the additional wager of one hundred credits on the third subset of the reels. In other words, the player has chosen to continue the game by spinning the fifth reel 54*e*. Accordingly, the wager meter 82 is updated to show that the player has wagered a total of one hundred sixty credits in the play of the game (i.e., ten credits for the first subset, plus fifty credits for the second subset, plus one hundred credits for the third subset). The fifth reel 54*e* is spinning while the first four reels 54*a*, 54*b*, 54*c*, and 54*d* are held stationary. That is, the symbols that were generated and displayed on the first four reels 54*a*, 54*b*, 54*c*, and 54*d* remain displayed, as the fifth reel 54*e* is spinning.

Figure 4G:
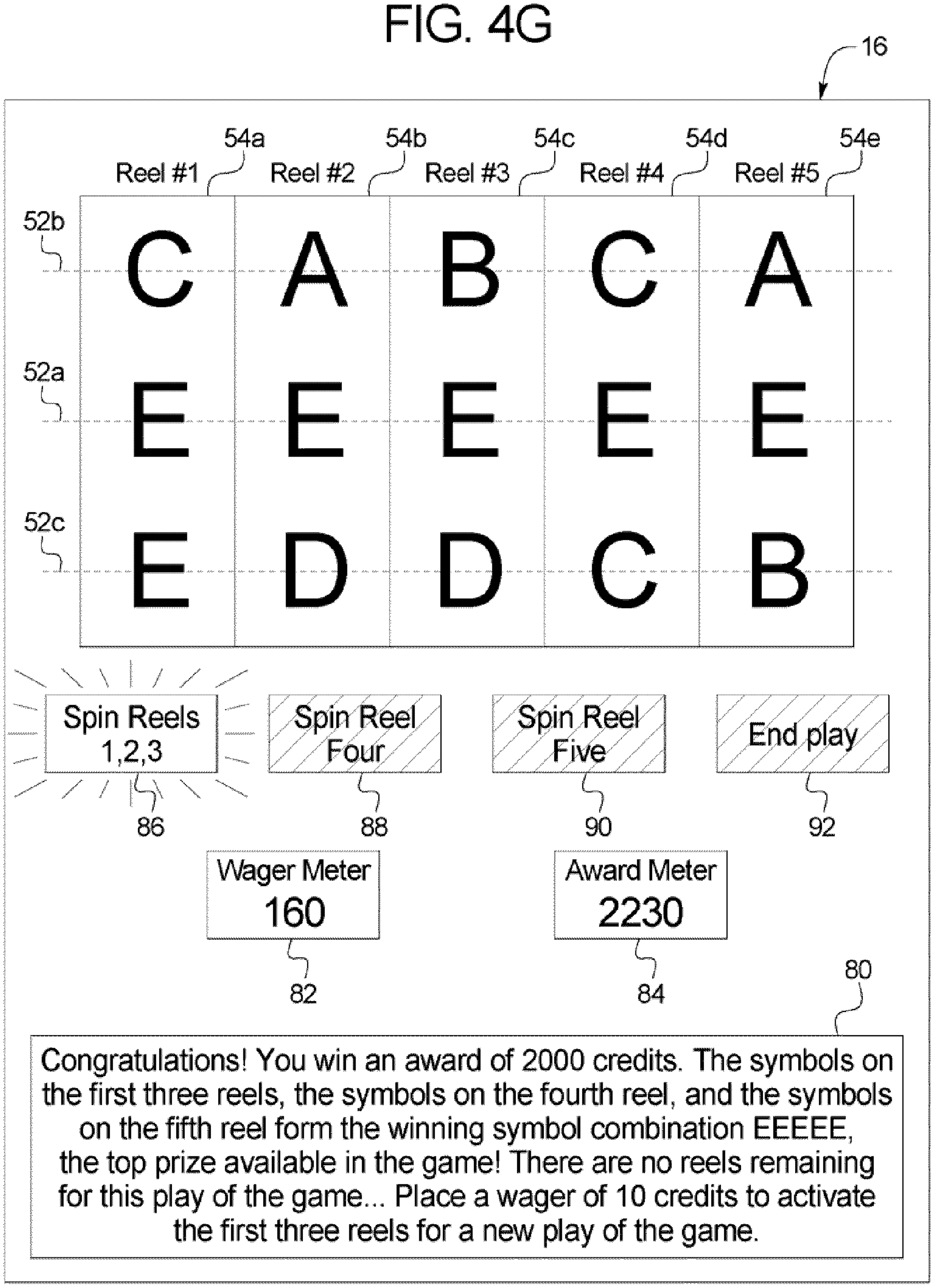

As illustrated in FIG. 4G, an outcome is generated and displayed for the third subset of the reels (i.e., the fifth reel 54*e*). The gaming device evaluates the symbols displayed on the fifth reel 54*e* in combination with the symbols displayed on the first four reels 54*a*, 54*b*, 54*c*, and 54*d*. The activation of the fifth reel 54*e* resulted in another "E" symbol indicated on the middle payline 52*a*. A symbol combination including five "E" symbols is indicated on the middle payline 52*a*. The gaming device employs paytable 300*c* of FIG. 5C to determine any awards. The winning symbol combination including five "E" symbols is associated with an award of two thousand credits, according to paytable 300*c*.

Thus, in FIG. 4G, the award meter 84 is updated to reflect that the player has won an additional award of two thousand credits in association with the third wager placed in the play of the game. More specifically, the award meter 84 now show the number "2230." The gaming device displays a message in message display 80 congratulating the player for winning the additional award of two thousand credits. Since there are no reels remaining that have not been activated in this play of the game, the play of the game is over. The message in the message display 80 indicates that the player can start a new play of the game by placing a wager of ten credits on the first subset of the reels.

Therefore, as illustrated by the example play of the game of FIGS. 4A to 4G, the present disclosure provides a gaming device which enables a player to play a game in stages, wherein after each stage, the player can choose whether or not he or she wishes to continue the play of the game. Based on the outcome generated for each stage of the game, the gaming device dynamically calculates the wager required to continue to the next stage in the game. As the player progresses through the stages of the game and more reels are activated, the gaming device offers the player a different paytable at each stage. In the illustrated example, as the player advances through the stages of the game, a paytable having at least some higher values applies. This causes the average expected payback to increase at each stage of the game (and with each additional wager placed).

In one embodiment, as the player progresses through the stages of the game, the wager amount required for each stage of the game is static (i.e., the same), and a different paytable is employed for determining awards at each stage.

In another embodiment, the gaming system does not require the player to separately wager on each different subset in the game. In one such embodiment, the gaming system enables the player to make an initial or first wager on a first subset. If the player wishes to continue building on the outcome received for the first subset, the gaming device enables the player to make an additional wager on two or more remaining subsets at the same time. For example, in a game having first, second, and third subsets of reels, after the player obtains an outcome for the first subset, the player can wager on the second and third paytables as a group. The additional wager required to do so is determined based on the outcome of the first subset. In one such embodiment, since the player is taking more risk by wagering on the second and third subsets as a group, the wager to continue in the game is less than if the player had wagered on the second subset and the third subset separately. Additionally, the gaming system may employ a better paytable to determine awards when the player elects to wager on the second and third subsets as a group, as opposed to wagering on the second subset and the third subset separately.

Figure 4H:
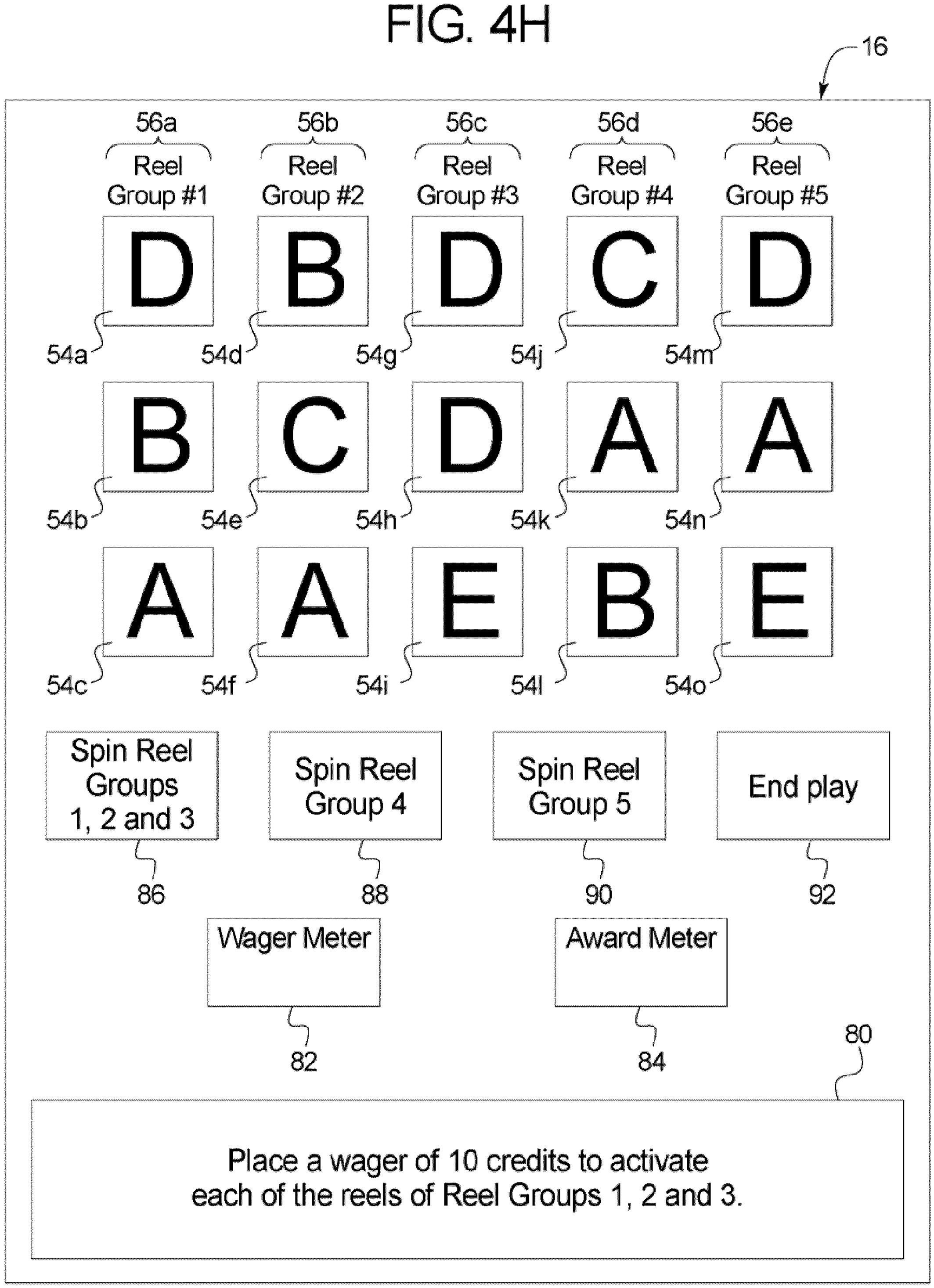
FIG. 4H is a front view of a display device of a gaming device of another embodiment disclosed herein, which enables a player to play a slot game in stages.

It should be appreciated that, in various alternative embodiments, rather than having dependent reels, one or more of the reels are independent or unisymbol reels. For example, as illustrated in FIG. 4H, a gaming device includes 15 independent or unisymbol reels 54*a* to 54*o*. In the example of FIG. 4H, independent or unisymbol reels 54*a* to 54*o* are arranged as a number of reel groups, such as columns 56*a* to 56*e* wherein each reel group includes one or more independent or unisymbol reels. In different embodiments, the reel groups are arranged as a plurality of reel columns or a plurality of rows of independent reels. Each independent reel is adapted to individually generate and display, independent of the other independent reels, one of a plurality of different indicia or symbols. In various embodiments, the gaming device awards prizes after the reels stop spinning if specified types and/or configurations of indicia or symbols occur on an active payline or otherwise occur in a winning pattern, occur on the requisite number of adjacent reels and/or occur in a scatter pay arrangement.

In one embodiment, the gaming device enables the player to place a wager on a first subset of the independent reels to cause an activation of the first subset, where the first subset includes a plurality but less than all of the plurality of independent reels. For instance, referring again to the example of FIG. 4H, the first subset may include each of the independent reels of columns 56*a* to 56*c*. After the activation of the first subset, the gaming device enables the player to activate any of the remaining reels. The gaming device dynamically calculates the cost (or wager required) to activate each of the remaining reels. After each activation, the wager required to activate each of the remaining reels is re-calculated. The player may continue purchasing additional reels until there are no reels remaining or until the player chooses to end the play of the game. After each activation, the gaming device determines any awards to provide to the player based on the symbols displayed on any reels which have been activated for the play of the game.

In one embodiment, the award determination is based on any paylines that pass through any displayed winning symbol combinations. In another embodiment, the gaming device determines any award to provide to the player based on the number of associated symbols which are generated on the requisite number of adjacent independent reels and not based on any paylines that would have passed through any displayed winning symbol combinations. In this embodiment, the gaming device analyzes the symbols generated by the independent reels in each of the active symbol positions to determine if a string of related symbols (i.e., a plurality of symbols which form part or all of a winning symbol combination) are generated wherein each string of related symbols includes one symbol from each of a requisite number of adjacent reel groups. As described above, if one or more strings of related symbols are generated, the gaming device determines if any of the strings of related symbols are associated with any awards and if so, such associated awards are provided to the player.

In another embodiment, upon placement of a wager by a player for first round or stage of a game, the gaming device activates the plurality of reels to each generate and display one of a plurality of different symbols. The gaming device enables player to lock or hold one or more of the activated independent reels from the first round or stage of the game for use in another, subsequent round or stage of the game. In one such embodiment, the wager amount required to continue to the subsequent round or stage of the game is dynamically calculated based on which reels are chosen to be held.

Figure 6:
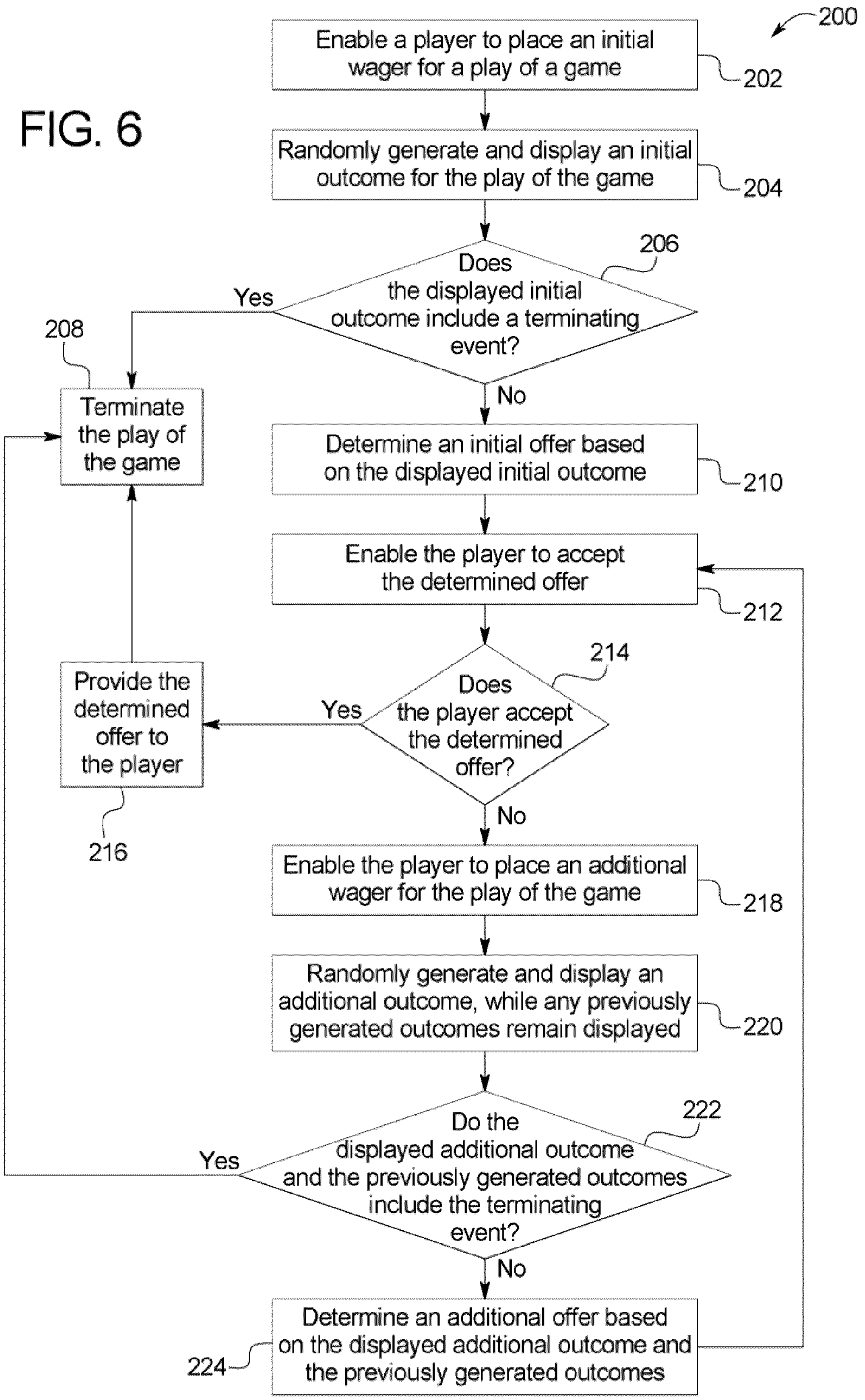
FIG. 6 is a flowchart of one example process for an alternative embodiment disclosed herein.

Referring now to FIG. 6, an alternative embodiment of the present disclosure operates according to sequence 200. In one embodiment, a gaming device includes an offer and acceptance game. As indicated by block 202, the gaming device enables a player to place an initial wager to initiate a play of the offer and acceptance game. After receiving the initial wager, the gaming device randomly generates and displays an initial outcome to the player, as indicated by block 204. At diamond 206, the gaming device determines whether the displayed initial outcome includes a terminating or game-ending event or condition. If the displayed initial outcome includes the terminating event, the play of the game ends, as indicated by block 208. If the initial outcome does not include the terminating event, the gaming device determines an initial offer based on the displayed initial outcome. More specifically, the gaming device determines an award to offer the player based on the displayed initial outcome. As indicated by block 212, the gaming device enables the player to accept the determined offer. The gaming device determines whether the player accepts the determined offer at diamond 114. If the player accepts the determined offer, the gaming device provides determined offer to the player and the play of the game ends, as indicated by blocks 216 and 208 respectively. If the player does not accept the determined offer, the gaming device enables the player to place a separate, additional wager for the play of the game, as indicated by block 218. Rejecting the determined offer and choosing to place the separate additional wager for the play of the game enables the player to obtain an additional outcome in the game in an attempt to improve or build on the offer. After the player places the separate additional wager for the play of the game, the gaming device randomly generates and displays the additional outcome, while any previously generated outcomes (including the initial outcome) remain displayed, as indicated by block 220.

At diamond 222, the gaming device evaluates the displayed additional outcome and any previously generated outcomes to determine whether the terminating event occurs. If the terminating event occurs, the game ends, as indicated by block 208. In this case, the player loses any previous offers, as well as any wagers placed for the play of the game. If the terminating event does not occur, the gaming device determines an additional offer based on the displayed additional outcome and any previously generated outcomes, as indicated by block 224. Once again, as indicated by block 212, the gaming device enables the player to accept the determined offer, and the above process continues until the terminating event occurs or until the player accepts an offer.

Referring now to FIGS. 7A, 7B, 7C, 7D, 7E, 7F, 67G, and 7H, an example embodiment of the present disclosure provides a gaming device which includes an offer and acceptance game. In the example embodiment of FIGS. 7A to 7H, a display device 16 displays a game having a symbol matrix 192 which includes a plurality of different symbol positions that define at least one column and at least one row, and preferably a plurality of columns and a plurality of rows. In the illustrated example, the matrix includes five columns, labeled with the letters A, B, C, D, and E. The matrix also includes five rows, labeled with the numbers 1, 2, 3, 4, and 5. In the illustrated embodiment, the matrix is substantially rectangular. However, it should be appreciated that the matrix may have any suitable shape or pattern.

The gaming device includes a wager meter 182, an award meter 184, and an offer display 190 for displaying award offers to the player during the game. The gaming device also includes an "Accept Offer" button 186 and a "Reject Offer & Get New Row" button 188. The gaming device further includes a message display 180, which communicates information regarding game status and outcomes to the player.

Figure 7A:
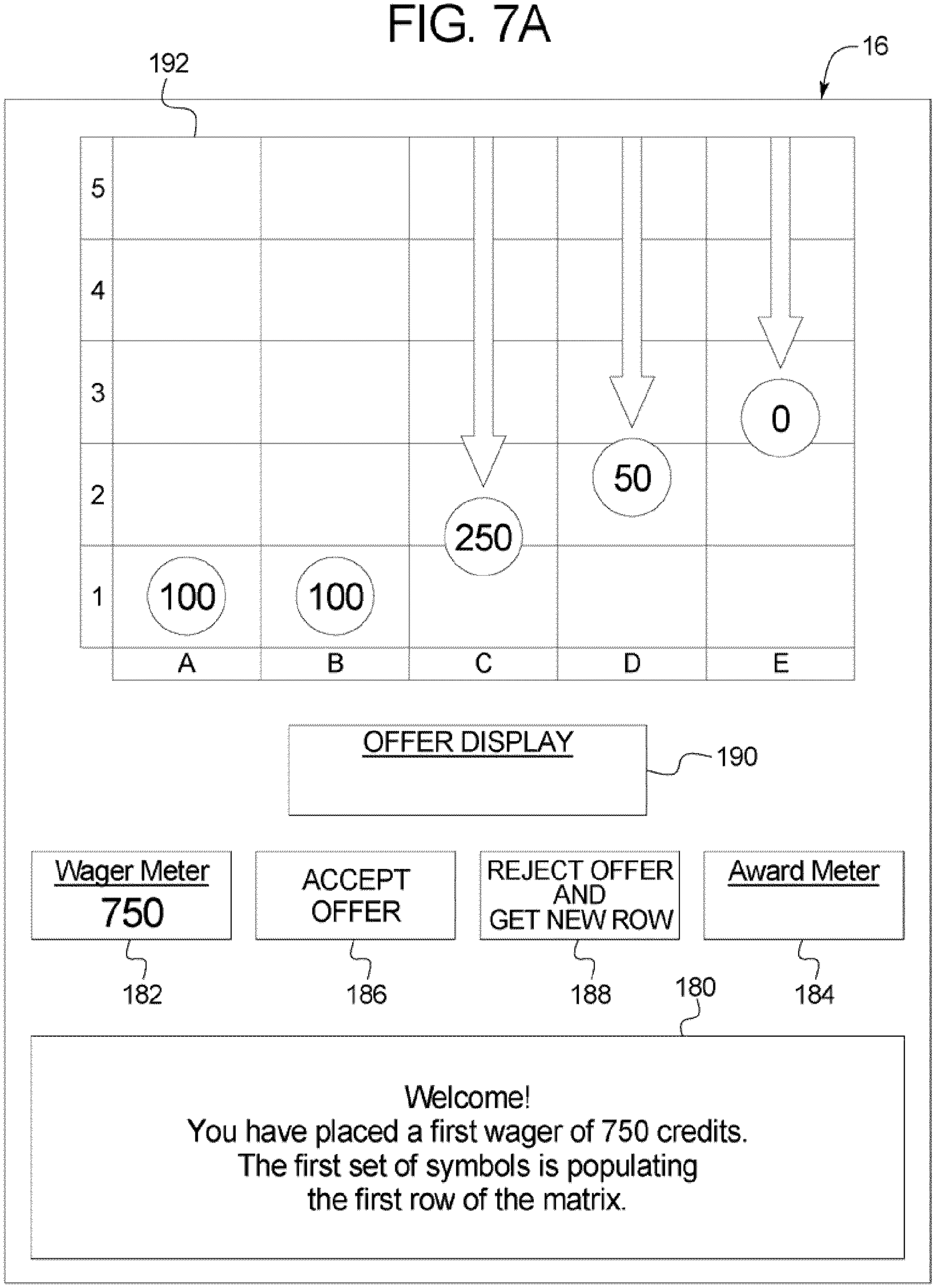
FIGS. 7A, 7B, 7C, 7D, 7E, 7F, 7G, and 7H are front views of a display device of a gaming device of an alternative embodiment disclosed herein, which enables a player to play an offer and acceptance game in stages.

Before the player places the first wager for the game, the matrix is blank or empty, such that no symbols are displayed in any of the symbol positions of the matrix. As illustrated in FIG. 7A, the gaming device displays a message in message display 80 indicating that the player has made a first wager of 750 credits in the game. Accordingly, a plurality of symbols enter the matrix. More specifically, symbols are "dropped" down into the matrix, such that one symbol fills each of the symbol positions of the bottom row (i.e., row 1) of the matrix.

Figure 7B:
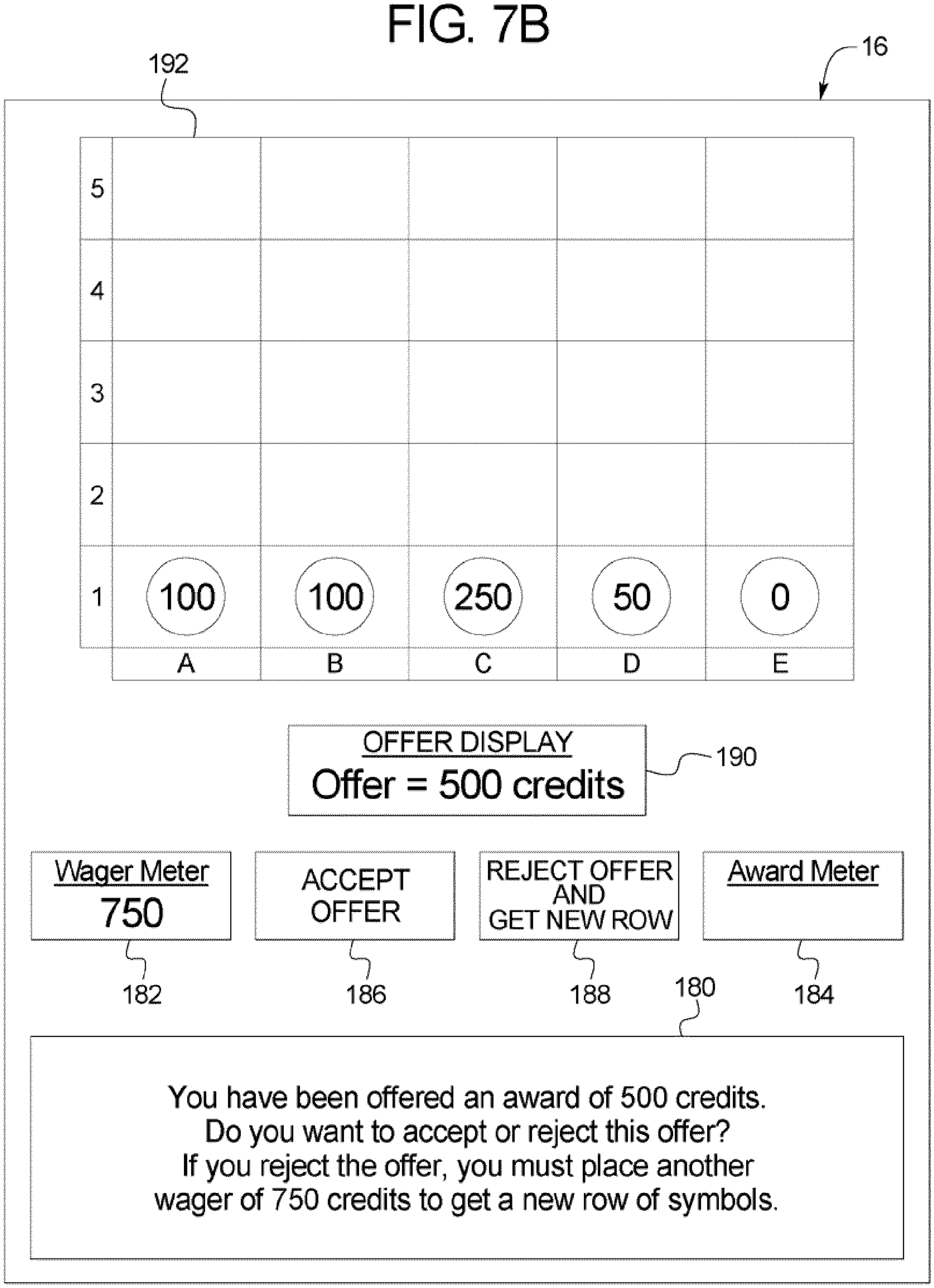

In FIG. 7B, the gaming device determines a first award to offer to the player. In the illustrated embodiment, the award offered to the player at each stage of the game is determined based on the symbols currently displayed in the matrix. More particularly, the offer is determined based on the value associated with each of the symbols displayed in the matrix.

In various embodiments, the amount of the award is determined based the symbols that have already entered into the matrix in the game and/or the symbols that may subsequently enter the matrix over the course of the game. In some embodiments, bonus symbols and/or multipliers may cause the offers to increase. In other embodiments, rather than determining the offer based on the respective values of the symbols displayed in the matrix, the gaming device may use a payline symbol evaluation method, a ways to win symbol evaluation method, or a combination of both to determine the award to offer to the player. For example, if the gaming device employs the payline evaluation method, after each row of symbols drops into the matrix, the gaming device determines whether any winning symbol combinations are generated on any active paylines. The gaming device offers the player an award based on the awards associated with any winning symbol combinations that are generated on any active paylines. In one embodiment, the offer amounts start small and get progressively larger as the player continues on in the game. In various embodiments, the award offered to a player at a subsequent stage of the game could be better or could be worse than an award previously offered to the player. It should be appreciated that the awards offered to the player may be determined in any suitable manner.

As seen in FIG. 7B, the symbols generated along the bottom row (i.e., row 1) of the matrix are associated with values of 100, 100, 250, 50, and 0, respectively. Based on these values, the gaming device offers the player an award of five hundred credits, as indicated by the offer display 190.

As indicated by the message in the message display 180, the player can accept the offered award of five hundred credits and, thus, end the play of the game. Alternatively, the player can reject the offered award and place an additional wager of 750 credits to cause the gaming device to generate another row of symbols.

It should be appreciated that, in some embodiments, at the initial stages of the game, the probability that the award offer will be smaller than the player's wager is high. As the player continues in the game (i.e., wagers on more rows of symbols), this probability decreases. As illustrated in FIG. 7B, the award of five hundred credits that is offered to the player is less than the player's wager of 750 credits. Accordingly, the player may wish to continue playing the game by wagering on a new row of symbols in an attempt to improve the current award offer. However, if a terminating event occurs as a result of the new row of symbols entering the matrix, the player will lose the current offer of 500 credits, as well as the wager placed in the play of the game. This is a risk that the player must take into account when deciding whether to accept the offered award or reject the offered award and continue on in the game.

Figure 7C:
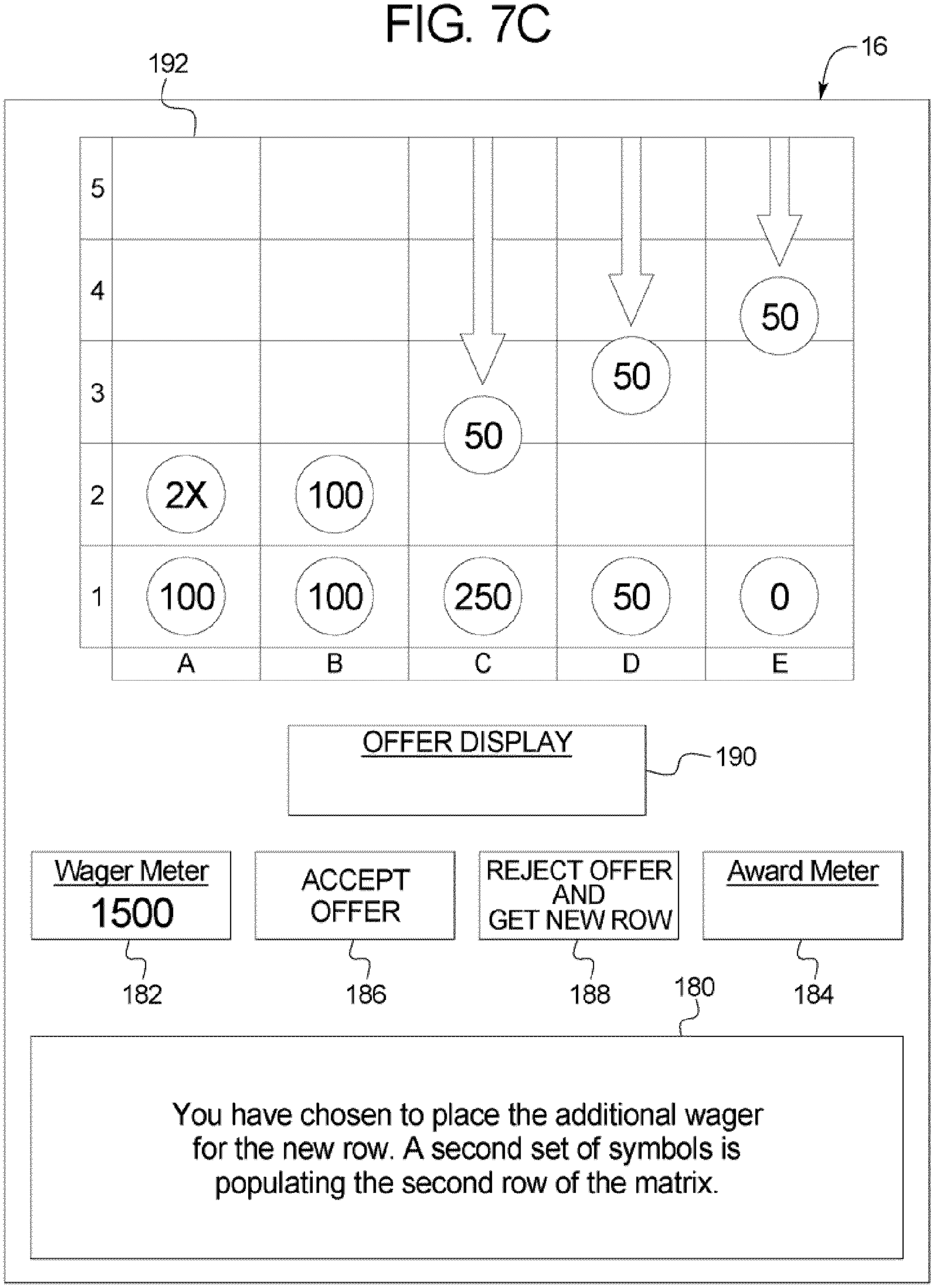

As illustrated in FIG. 7C, the player has chosen to place the additional wager of 750 credits to obtain a new row of symbols. Accordingly, the wager meter 182 shows the number "1500" to reflect the total wager that the player has placed in the play of the game. A new row of symbols is entering the matrix 192, stacking on top of the previously filled row of symbols.

Figure 7D:
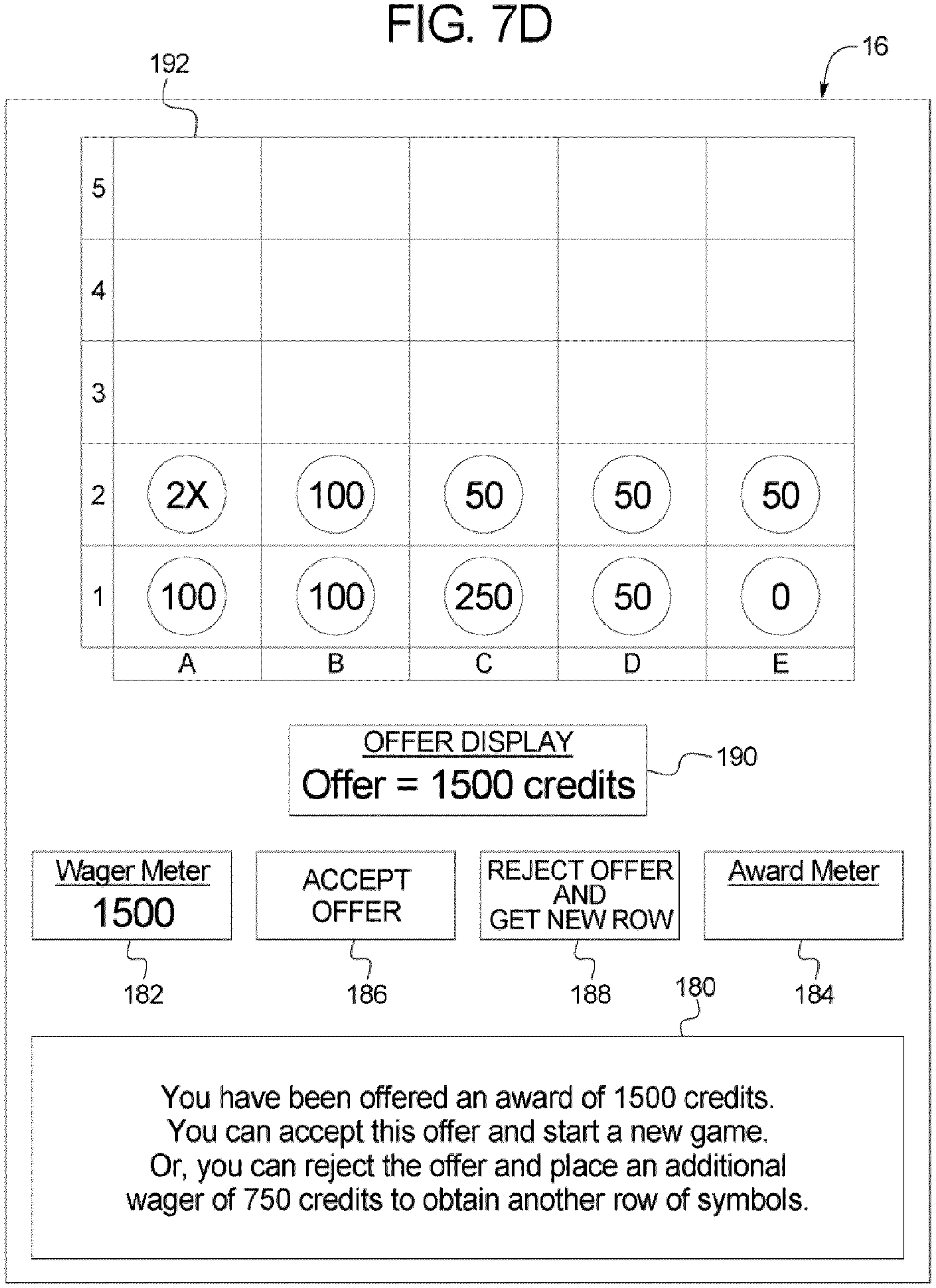

In FIG. 7D, symbols have filled the symbol positions of the next available row in the matrix (i.e., row 2). The symbols in row 2 are associated with values of 2×, 100, 50, 50, and 50, respectively. The gaming device evaluates the new symbols displayed in row 2 of the matrix in combination with the symbols displayed in row 1 of the matrix to determine the award that will be offered to the player. The symbols currently displayed in the matrix include a multiplier symbol (i.e., the 2× symbol displayed in symbol position 2A). The gaming device determines the award by adding all of the symbols associated with a value and modifying the sum by the 2× multiplier. Accordingly, based on the symbols currently displayed in the matrix, the gaming device offers the player an award of 1500 credits, as indicated by the offer display 190. The gaming device displays a message in the message display 180 prompting the player to accept or reject the displayed offer. If the player accepts the offer, the gaming device will provide the player with the offered award and all symbols will be cleared from the matrix (i.e., the game ends). If the player rejects the offered award, the player will have the chance to place another wager of 750 credits to obtain a new row of symbols.

Figure 7E:
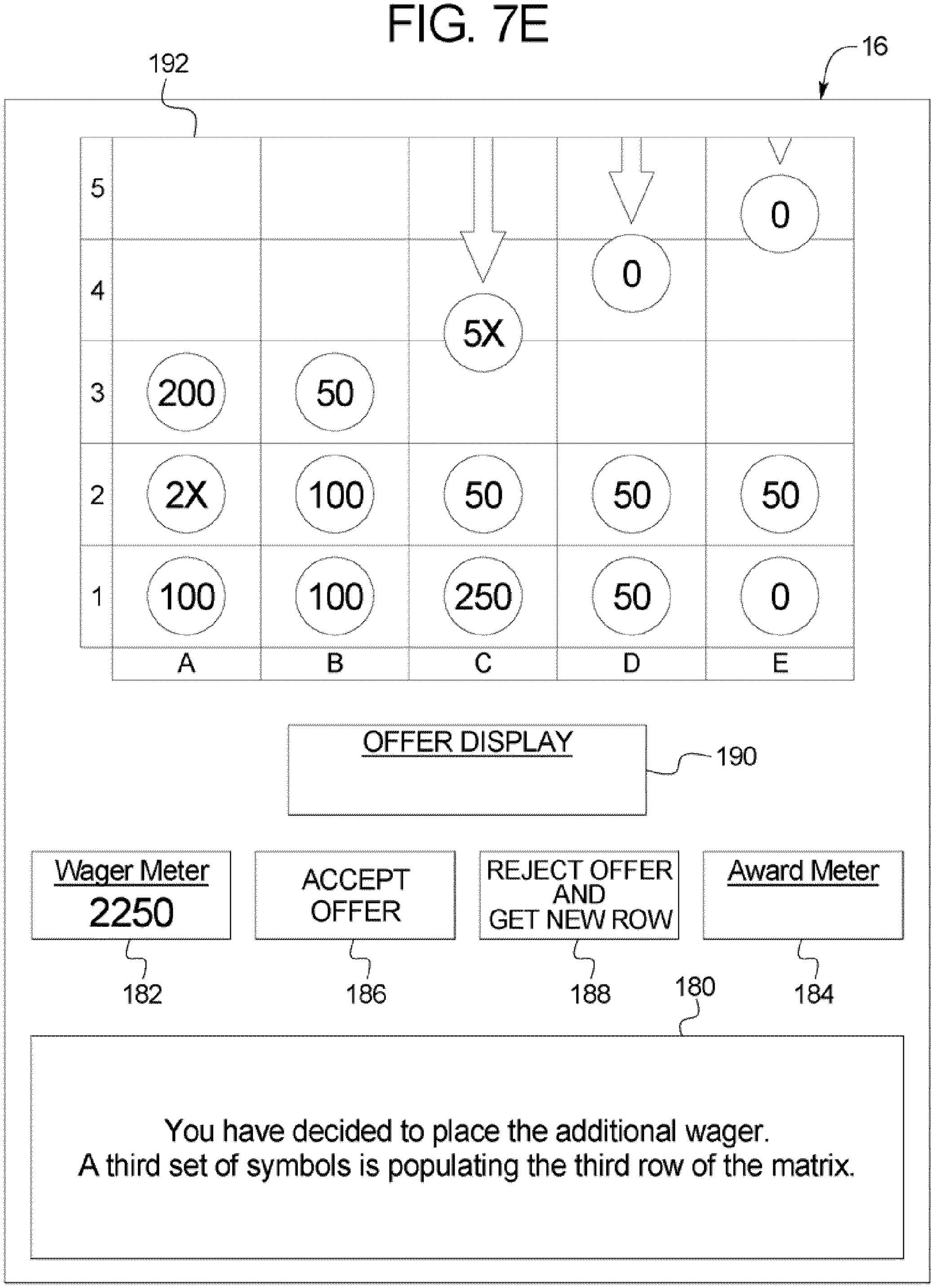

As illustrated in FIG. 7E, the player has chosen to reject the offer and to place the additional wager of 750 credits to obtain a new row of symbols. A new row of symbols is entering the matrix, stacking on top of the previously filled row of symbols. The wager meter 180 shows the number "2250" to reflect the total amount that the player has wagered in the play of the game.

Figure 7F:
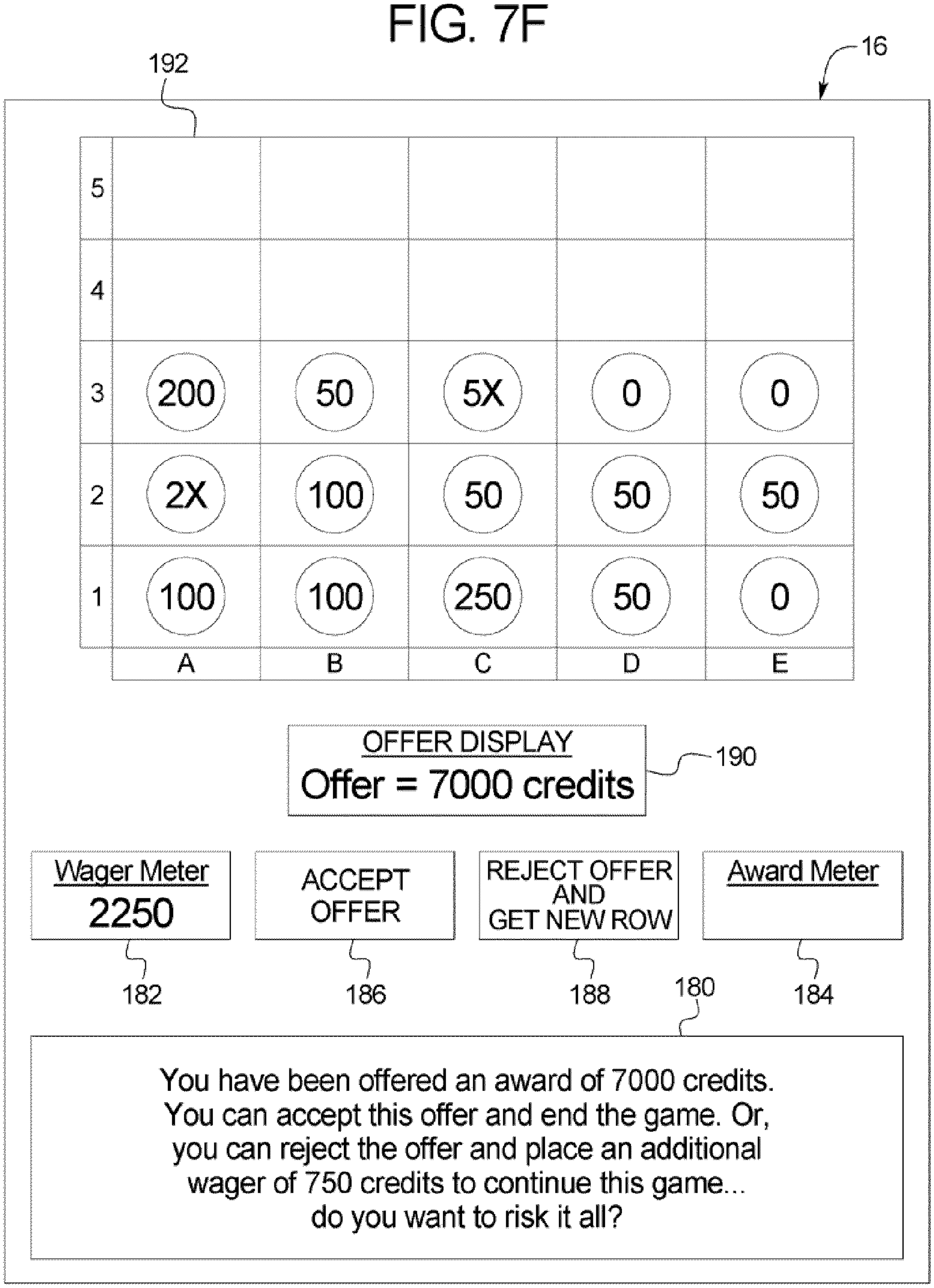

In FIG. 7F, symbols have entered the matrix and filled each of the symbol positions of row 3. The symbols displayed in row 3 of the matrix have values of 200, 50, 5×, 0, and 0, respectively. Since another multiplier symbol has been generated, this multiplier (i.e., 5×) is added to the previously generated multiplier (i.e., 2×). The sum of the values associated with the other symbols displayed in the matrix is multiplied by seven to determine the award offer. Accordingly, as indicated by the offer display 190, the gaming device offers the player an award of 7000 credits. As indicated by the message in the message display, the player can either accept this offer (and, thus, cause the game to end), or the player can reject the offer and obtain a new row of symbols. However, if a terminating event occurs as a result of the new row of symbols entering the matrix, the player will lose the current offer of 7000 credits, as well as all the wagers placed in the play of the game.

Figure 7G:
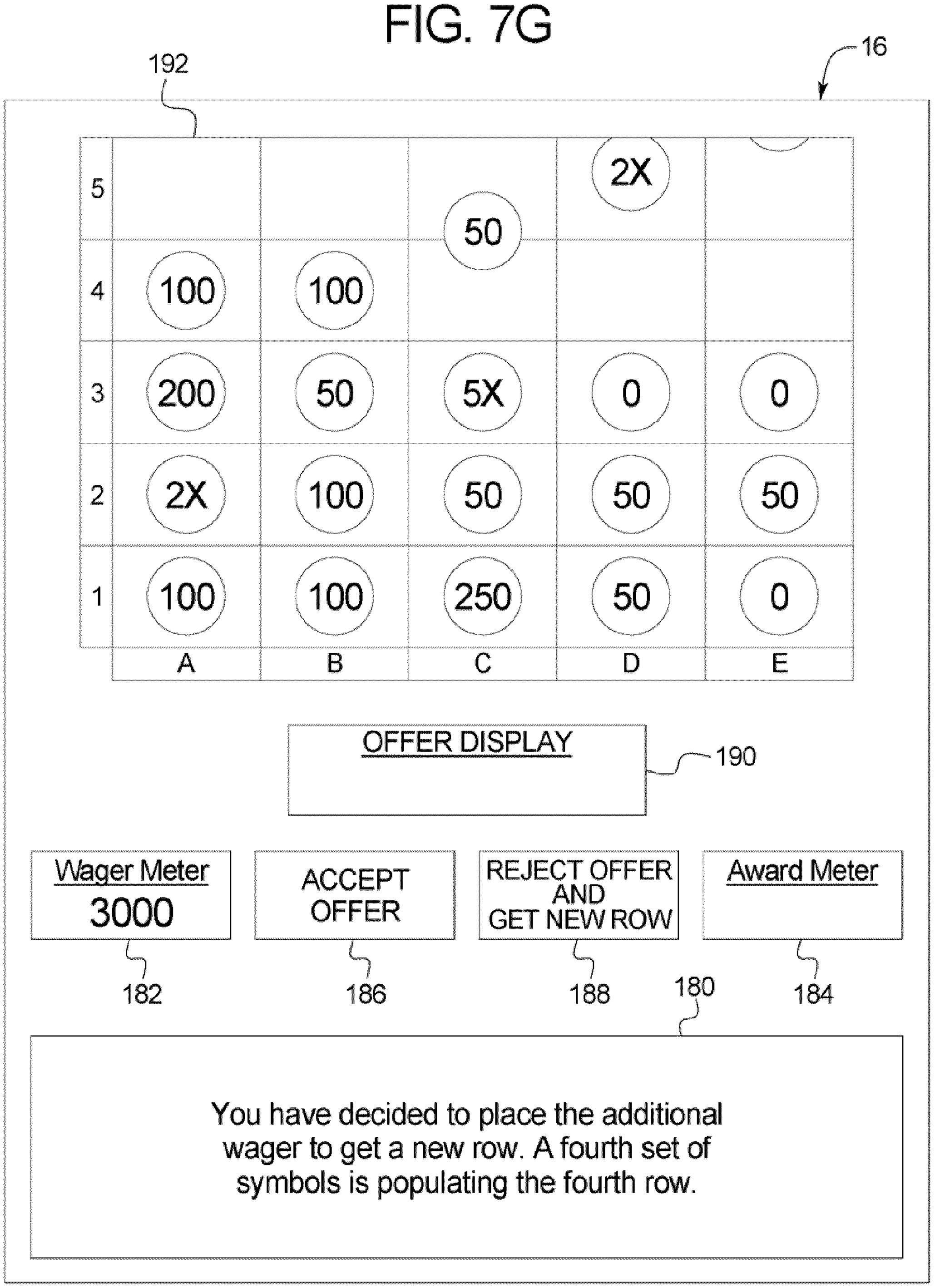

As illustrated in FIG. 7G, the player has chosen to reject the offer of 7000 credits and to place the additional wager of 750 credits to obtain yet another row of symbols. A new row of symbol is entering the matrix, stacking on top of the previously filled row of symbols.

Figure 7H:
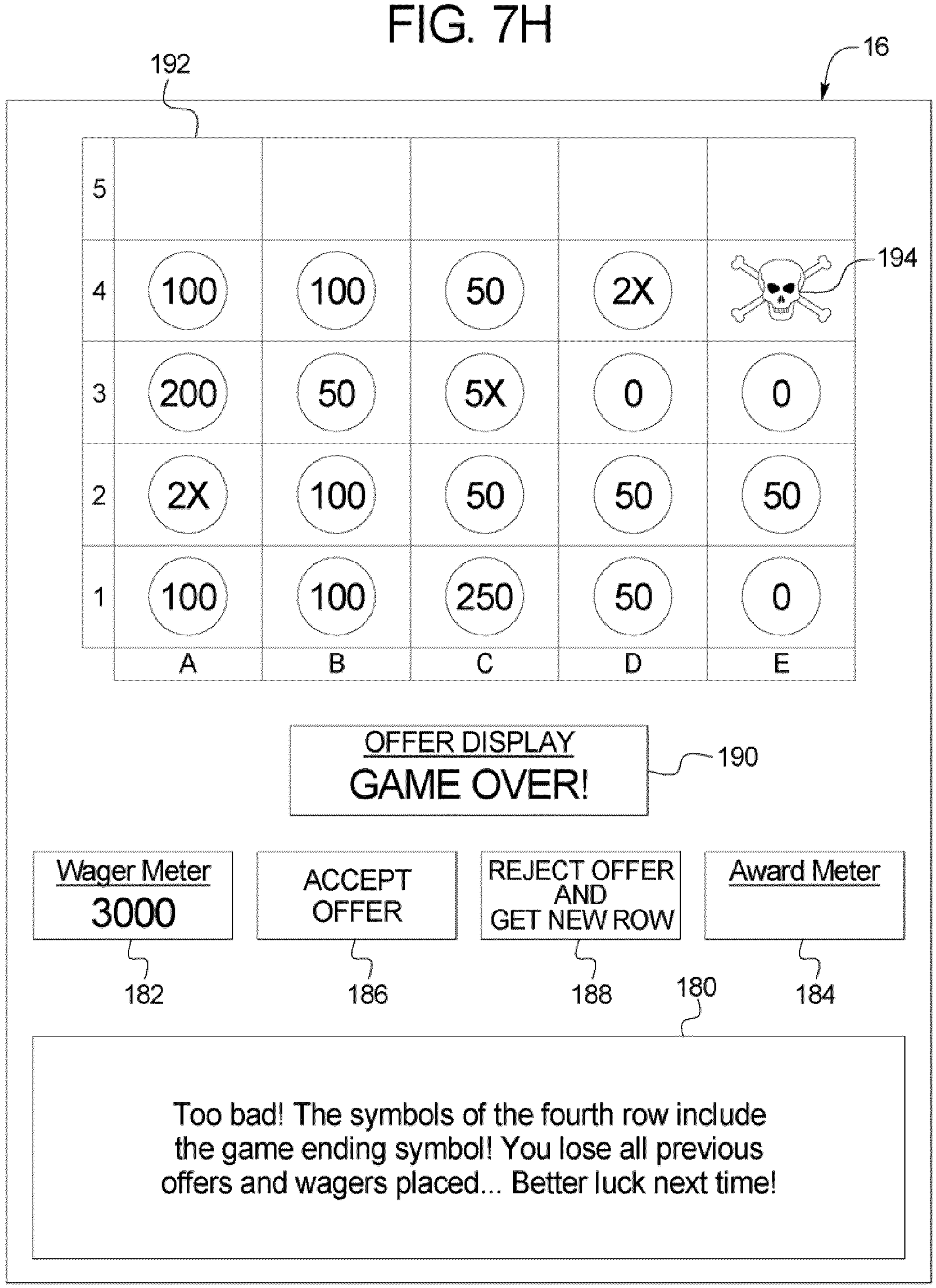

In FIG. 7H, symbols have entered the matrix and filled each of the symbol positions of row 4. The symbols displayed in row 4 include the skull-and-cross-bones symbol, which is located at symbol position 2E. This symbol is the terminator or game-ending symbol in the game. Since the terminator symbol has appeared in the matrix, the game ends. The player loses the previously offered award of 7000 credits, as well as all previous wagers placed for the play of the game.

Accordingly, as illustrated by the example embodiment of FIGS. 7A to 7H, symbols drop into the matrix one row at a time. Each time a row is filled with symbols, the gaming device makes the player an offer. If the player accepts the offer, the game ends and the symbols in the filled row disappear from the display matrix. If the player rejects the offer, the player has the opportunity to make the additional wager on a new row of symbols. If the player utilizes the opportunity and places the additional wager, a new row of symbols drops down into the matrix, stacking on top of the previously filled row of symbols. Based on the new symbols that have dropped into the display matrix and the symbols that were already displayed in the display matrix, the gaming device will make the player a second, different award offer. The player can choose to accept or reject this offer. If the player rejects the offer, the player again has the opportunity to increase their wager (i.e., place an additional wager amount) and continue dropping symbols into the next row of the display matrix in an attempt to improve upon the currently displayed outcome(s). This process continues until the player accepts the offer, until the matrix is full, or until a terminating event occurs. In this manner, as the player advances from one stage of the game to the next, the player is betting on how long the player can last without losing the offered award.

In one alternative embodiment, rather than putting the entire offered award at stake when the player advances from one stage to the next (i.e., wagers on another row of symbols), the gaming device enables a player to sacrifice only a percentage or portion of the offered award. This reduces the volatility associated with the play of the game.

It should be appreciated that, in the example embodiment illustrated in FIGS. 7A to 7H, the wager required for each stage of the game is static. In other embodiments, the wager is dynamic and changes from one stage to the next based, at least in part, on the outcome received at the previous stage.

In one embodiment, the terminating event occurs when a designated symbol is dropped into the matrix, such as a terminator symbol. In one such embodiment, if the terminator symbol appears in any row, the game ends. In another embodiment, the terminating condition occurs if terminator symbols are generated in different rows and in adjacent symbol positions of the matrix. In another embodiment, if a designated number of terminator symbols, such as two or more terminator symbols, are generated in the same row, they cancel each other out.

In one embodiment, the game includes protector symbols which counteract the effect of the terminator symbols. In one such embodiment, protector symbols are associated with a value that may be added to the offer when the protector symbols are generated and displayed in the matrix. In another embodiment, protector symbols do not add value to the offered award and just prevent the game from ending if a terminator symbol is generated and displayed in the matrix during the course of the game. In one embodiment, the player can purchase protector symbols. In another embodiment, the player can earn or win protector symbols, such as for obtaining certain game outcomes during game play.

In one embodiment, the terminating event occurs when a row of symbols is dropped into the matrix which does not include any matching symbols. That is, each time a new row of symbols falls into the matrix, that row must include one or more matching pairs of symbols, otherwise the game ends. In one embodiment, matching pairs of symbols must be in the same row. In another embodiment, matching pairs of symbols must be in different rows and adjacent to each other. It should be appreciated that, in various embodiments, matching symbols may be in any suitable arrangement relative to each other, to cause the terminating event or prevent the terminating event from occurring.

It should be appreciated that, in different embodiments, when the terminating event occurs may be predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's wager, determined based on time (such as the time of day), determined based on an amount of coin-in accumulated in one or more pools or determined based on any other suitable method or criteria.

In one embodiment, the gaming device provides the player with bonus awards for obtaining one or more designated combinations of symbols, such as pairs of matching symbols. In one embodiment, when a designated combination of symbols (e.g., a winning combination or a pair of matching symbols, etc.) enter the matrix, the symbols of the designated combination disappear, causing the stack of symbols currently displayed in the matrix to collapse. In one such embodiment, when the symbols disappear from the matrix, this causes the amount of the award offered to the player to decrease. This adds another level of risk to advancing to the next level in the game.

In one embodiment, the gaming device offers the player other wagers in the play of the game. In one such embodiment, the gaming device enables the player to wager on certain events occurring in the game. For example, the player can wager on whether or not a designated symbol (or a designated pair of symbols) will be generated and displayed in the matrix.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device which stores a plurality of instructions that, when executed by the at least one processor, cause the at least one processor to operate with the at least one display device and the at least one input device, for a play of a game, to:

(a) display a plurality of reels associated with the game, each of said reels including a plurality of different symbols;

(b) enable a player to place a first wager for said play of the game;

(c) after receiving the first wager, cause an activation of a first subset of said plurality of reels, said first subset including less than all of said plurality of reels, to cause the reels in the first subset to each display at least one of said symbols;

(d) evaluate the symbols displayed on the reels of the first subset as a result of the activation of the first subset to determine whether said displayed symbols form any winning symbol combinations in accordance with a first paytable from a plurality of different paytables;

(e) provide any awards associated with any winning symbol combinations formed by the symbols displayed on the reels of the first subset in accordance with the first paytable;

(f) determine a second wager for said play of the game, said second wager required to cause an activation of a second subset of the reels, said second subset including at least one reel of the plurality of reels and none of the reels of the first subset, wherein said second wager is of an amount which is determined based, at least in part, on the displayed symbols resulting from the activation of the first subset and the symbols of any remaining reels which have not been activated for said play of the game;

(g) display said determined second wager;

(h) enable the player place the determined second wager for said play of the game;

(i) if the player places the second wager:

(i) cause said activation of the second subset of the reels to cause the reels of the second subset to each display at least one of the symbols, while holding the reels of the first subset stationary, (ii) evaluate the symbols displayed on the reels of the second subset in combination with the symbols displayed on the reels of the first subset to determine whether said symbols form any winning symbol combinations in accordance with a second paytable from the plurality of different paytables, and (iii) provide any awards associated with any winning symbol combinations formed by the symbols displayed on the reels of the first subset and the symbols displayed on the reels of the second subset in accordance with the second paytable; and (j) if a terminating event occurs, terminate said play of the game.

2. The gaming system of claim 1, wherein the first subset includes a plurality of the plurality of reels.

3. The gaming system of claim 2, wherein the second subset includes a plurality of the plurality of reels.

4. The gaming system of claim 1, wherein the second subset includes a plurality of the plurality of reels.

5. The gaming system of claim 1, wherein each of said plurality of different paytables has an average expected payback.

6. The gaming system of claim 5, wherein each of said plurality of different paytables has a different average expected payback.

7. The gaming system of claim 6, wherein the average expected payback of the second paytable is higher than the average expected payback of the first paytable.

8. The gaming system of claim 5, wherein the second paytable and the first paytable have the same average expected payback and different volatilities.

9. The gaming system of claim 6, wherein the second paytable and the first paytable have the same volatility.

10. The gaming system of claim 6, wherein the second paytable and the first paytable have different volatilities.

11. The gaming system of claim 5, wherein, after the second subset of the reels is activated, if there is at least one subset of the reels remaining which has not been activated in said play of the game, the plurality of instructions, when executed by the at least one processor, cause the at least one processor to:

(a) determine a third wager for said play of the game, said third wager required to cause an activation of a third subset of the reels;

(b) display said determined third wager;

(c) enable the player place the determined third wager for said play of the game;

(d) if the player places the third wager:

(i) cause the activation of the third subset of the reels to cause the reels of the third subset to each display at least one of the symbols, while holding the reels of the first subset and the reels of the second subset stationary, (ii) evaluate the symbols displayed on the reels of the third subset in combination with the symbols displayed on the reels of the first subset and the symbols displayed on the reels of the second subset to determine whether any winning symbol combinations are formed in accordance with a third paytable from the plurality of different paytables, and (iii) provide any awards associated with any winning symbol combinations formed by the symbols displayed on the reels of the first subset, the symbols displayed on the reels of the second subset, and the symbols displayed on the reels of the third subset in accordance with the third paytable; and (e) if the terminating event occurs, terminate said play of the game.

12. The gaming system of claim 11, wherein the third subset includes at least one reel and wherein none of the reels of the third subset are in the first subset and the second subset.

13. The gaming system of claim 11, wherein the third wager is of an amount which is determined based, at least in part, on the displayed symbols resulting from the activation of the first and second subsets and the symbols of any remaining reels which have not been activated for said play of the game.

14. The gaming system of claim 11, wherein each of said plurality of different paytables has a different average expected payback.

15. The gaming system of claim 14, wherein the average expected payback of the second paytable is higher than the average expected payback of the first paytable, and the average expected payback of the third paytable is higher than the average expected payback of the second paytable.

16. The gaming system of claim 14, wherein each of said plurality of different paytables has a different volatility.

17. The gaming system of claim 11, wherein said plurality of different paytables each have a same average expected payback and different volatilities.

18. The gaming system of claim 1, wherein the terminating event occurs if the player does not place the second wager.

19. The gaming system of claim 1, wherein the reels include dependent reels.

20. The gaming system of claim 1, wherein the reels include independent reels.

21. The gaming system of claim 1, wherein the plurality of instructions, when executed by the at least one processor, cause the at least one processor to determine any awards to provide to the player based on any formed strings of related symbols which correspond to at least one winning combination of said symbols.

* * * * *

UNITED STATES PATENT AND TRADEMARK OFFICE

CERTIFICATE OF CORRECTION

PATENT NO. : 8,608,543 B2
APPLICATION NO. : 12/615821
DATED : December 17, 2013
INVENTOR(S) : Ryan W. Cuddy et al.

It is certified that error appears in the above-identified patent and that said Letters Patent is hereby corrected as shown below:

IN THE CLAIMS

In Claim 1, Column 35, Line 17, between "player" and "place" insert --to--.
In Claim 11, Column 36, Line 5, between "player" and "place" insert --to--.

Signed and Sealed this
Fourteenth Day of October, 2014

Michelle K. Lee

Michelle K. Lee
*Deputy Director of the United States Patent and Trademark Office*